US007346266B2

(12) United States Patent
Ando et al.

(10) Patent No.: US 7,346,266 B2
(45) Date of Patent: Mar. 18, 2008

(54) DIGITAL VIDEO RECORDING SYSTEM AND ITS RECORDING MEDIUM

(75) Inventors: Hideo Ando, Hino (JP); Kazuyuki Uyama, Kumagaya (JP); Shinichi Kikuchi, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 424 days.

(21) Appl. No.: 10/232,814

(22) Filed: Sep. 3, 2002

(65) Prior Publication Data

US 2003/0059196 A1    Mar. 27, 2003

Related U.S. Application Data

(60) Continuation of application No. 09/805,876, filed on Mar. 15, 2001, now abandoned, which is a division of application No. 09/482,085, filed on Jan. 13, 2000, now Pat. No. 7,076,153.

(30) Foreign Application Priority Data

Jan. 14, 1999    (JP)    ................... 11-007842

(51) Int. Cl.
*H04N 5/91* (2006.01)
(52) U.S. Cl. .................. 386/95; 386/111; 386/112; 386/125
(58) Field of Classification Search .................. 386/46, 386/95, 111, 112, 83, 125, 126
See application file for complete search history.

(56) References Cited

U.S. PATENT DOCUMENTS

| | | | | |
|---|---|---|---|---|
| 5,801,781 A | * | 9/1998 | Hiroshima et al. | ......... 348/441 |
| 5,918,020 A | * | 6/1999 | Blackard et al. | ............ 709/228 |
| 6,034,942 A | * | 3/2000 | Yoshio et al. | ............ 369/275.3 |
| 6,078,727 A | * | 6/2000 | Saeki et al. | .................. 386/125 |
| 6,112,009 A | | 8/2000 | Kikuchi et al. | ............... 386/95 |
| 6,118,927 A | | 9/2000 | Kikuchi et al. | ............... 386/95 |
| 6,470,135 B1 | * | 10/2002 | Kim et al. | ..................... 386/68 |
| 6,701,059 B1 | * | 3/2004 | Yoo et al. | ..................... 386/46 |
| 2003/0113096 A1 | * | 6/2003 | Taira et al. | ................... 386/46 |

FOREIGN PATENT DOCUMENTS

| | | |
|---|---|---|
| EP | 0737975 A2 * | 10/1996 |
| JP | 6-139704 | 5/1994 |
| JP | 6-314176 | 11/1994 |
| JP | 7-87443 | 3/1995 |
| JP | 07-141116 | 6/1995 |
| JP | 07-193785 | 7/1995 |
| JP | 07-226032 | 8/1995 |
| JP | 7-284060 | 10/1995 |
| JP | 08-124309 | 5/1996 |
| JP | 8-125971 | 5/1996 |

(Continued)

*Primary Examiner*—Huy Nguyen
(74) *Attorney, Agent, or Firm*—Oblon, Spivak, McClelland, Maier & Neustadt, P.C.

(57) ABSTRACT

In a DVD recording/playback system, a set top box STB receives an MPEG transport stream constituted by a plurality of transport packets, and a formatter extracts support information indicating if management information included in the transport packets includes predetermined items. A disc drive that records data on a recording medium having a management area and data area records the support information in the management area.

2 Claims, 30 Drawing Sheets

| | FOREIGN PATENT DOCUMENTS | |
|---|---|---|
| JP | 10-125003 | 5/1996 |
| JP | 08-195072 | 7/1996 |
| JP | 8-205085 | 8/1996 |
| JP | 08-235832 | 9/1996 |
| JP | 8-306137 | 11/1996 |
| JP | 08-306137 | 11/1996 |
| JP | 8-339637 | 12/1996 |
| JP | 9-139937 | 5/1997 |
| JP | 9-219085 | 8/1997 |
| JP | 9-322148 | 12/1997 |
| JP | 10-322661 | 12/1998 |
| JP | 2000-195170 | 7/2000 |
| JP | 2000-217066 | 8/2000 |
| JP | 2002-157840 | 5/2002 |
| JP | 2005-243235 | 9/2005 |
| WO | WO 97/07506 | 2/1997 |

* cited by examiner

PGC_GI (SC_GI)

(a)

| | CONTENTS |
|---|---|
| PGC_CNT | NUMBER OF PROGRAMS, NUMBER OF CELLS |
| PGC_TRS_TM | RECORDING TIME PER PGC |
| SUPPORT INFO | SUPPORT INFORMATION (DETAILS ARE LISTED BELOW) |
| PGC_PGMAP_SA | START ADDRESS OF PROGRAM MAP |
| C_PBIT_SA | START ADDRESS OF C_PBIT |
| C_POSIT_SA | START ADDRESS OF C_POSIT |
| ARCHIVE FLAG (C_TY1 & TE) | ERASE INHIBITION FLAG 0: FREE, 1: SAVE PERMANENTLY |
| SC_EPI_Ns | NUMBER OF ENTRY POINT INFORMATION |
| SOB_N | STREAM OBJECT NUMBER |
| SC_S_APAT | STREAM CELL START APAT |
| SC_E_APAT | STREAM CELL END APAT |
| if (TE=='10b') { | |
| ERA_S_APAT | ERASE START APAT |
| ERA_E_APAT | ERASE END APAT |

(b)

| b7 b5 | b4 | b3 | b2 | b1 | b0 |
|---|---|---|---|---|---|
| IDENTIFICATION CODE OF STB THAT RECORDED DATA | SCD SUPPORT | PCR SUPPORT | PAT, PMT SUPPORT | UNIT START INDICATOR SUPPORT | RANDOM ACCESS INDICATOR SUPPORT |

RANDOM ACCESS
INDICATOR SUPPORT FLAG
  0b···NOT SUPPORTED,
  1b···SUPPORTED
UNIT START INDICATOR
SUPPORT FLAG
  0b···NOT SUPPORTED,
  1b···SUPPORTED
PAT, PMT SUPPORT FLAG
  0b···NOT SUPPORTED,
  1b···SUPPORTED
PCR SUPPORT FLAG
  0b···NOT SUPPORTED,
  1b···SUPPORTED
SCD SUPPORT FLAG
  0b···NOT SUPPORTED,
  1b···SUPPORTED
PCR=PRESENTATION CLOCK
  REFERENCE
SCD=SPLICE COUNTDOWN

STB IDENTIFICATION CODE
001:STB OF BS DIGITAL BROADCAST
010:Ver2 STB OF DirecTV
011:Ver1 STB OF SKY PERFECT TV
C_TY1···'010b' SHALL BE DESCRIBED
  FOR ALL STREAM CELLS
TE···'00b':THIS CELL IS IN THE
  "NORMAL" STATE
'01b':THIS CELL IS IN "TEMPORARILY
  ERASED" STATE; AND THIS CELL STARTS
  AFTER THE FIRST APPLICATION PACKET
  OF A SOBU AND ENDS BEFORE THE LAST
  APPLICATION PACKET OF THE SAME SOBU
'10b':THIS CELL IS IN "TEMPORARILY
  ERASED" STATE; AND THIS CELL
  CONTAINS AT LEAST ONE SOBU
  BORDER (FIRST OR LAST
  APPLICATION PACKET OF A
  SOBU). ERA_S_APAT AND
  ERA_E_APAT EXIT FOR THIS CELL

FIG. 7

C_PBI (SCI)

| RBP | | CONTENTS | NUMBER OF BYTES |
|---|---|---|---|
| 0 TO 0 | C_CAT (C_TY) | CELL TYPE 02: STREAMER CELL | |
| 1 TO 4 | C_ARLTM | STC VALUE OR PCR UPON RECORDING HEAD OF CELL OF INTEREST | |
| 5 TO 8 | C_FVOBU_SA | START ADDRESS OF CELL | |
| 9 TO 12 | C_LVOBU_SA | START ADDRESS OF LAST VOBU OF CELL | |
| 13 TO 16 | C_LVOBU_EA | END ADDRESS OF LAST VOBU OF CELL | |
| 17 TO 18 | TS PACKET LENGTH | TS PACKET LENGTH: NORMAL: 0xbc | |
| 19 TO 22 | REFPIC_Ns (AU_Ns) | NUMBER OF I-PICTURES | |
| 23 TO 26 | REFPIC_SA_#1 (AUSM) | START ADDRESS OF I-PICTURE #1 | |
| 27 TO 30 | REFPIC_EA_#1 (AUEM) | END ADDRESS OF I-PICTURE #1 | |
| ... | | | |
| 23+(n-1)×8 | REFPIC_SA_#n (AUSM) | START ADDRESS OF I-PICTURE #n | |
| 27+(n-1)×8 | REFPIC_EA_#n (AUEM) | END ADDRESS OF I-PICTURE #n | |
| | | TOTAL | 30+(n-1)×8 |

REFPIC_Ns: NUMBER OF I-PICTURES ("0" IF NO RANDOM ACCESS INDICATOR IS AVAILABLE)
REFPIC_SA#n: ADDRESS OF TS PACK INCLUDING FIRST TS PACKET OF I-PICTURE #n
(TS PACK WITH ACTIVE RANDOM ACCESS INDICATOR)
AUD REFPIC_EA#n: ADDRESS OF TS PACK INCLUDING LAST TS PACKET OF I-PICTURE #n
(TS PACK WITH ACTIVE UNIT START INDICATOR)
("0" IF NO UNIT START INDICATOR IS AVAILABLE)

FIG. 8

VOBUI (SOBI)

| RBP | | CONTENTS | NUMBER OF BYTES |
|---|---|---|---|
| 0 TO 3 | VOBU START ADDRESS | START ADDRESS OF VOBU | |
| 4 TO 7 | VOBU END ADDRESS (OR LENGTH) | END ADDRESS OR LENGTH OF VOBU | |
| 8 TO 11 | VOBU_RECTM | STC VALUE OR PCR UPON RECORDING HEAD OF VOBU OF INTEREST | |
| 12 TO 13 | TS PACKET LENGTH | TS PACKET LENGTH: NORMAL: 0xbc | |
| 14 TO 17 | REFPIC_Ns (AU_Ns) | NUMBER OF I-PICTURES | |
| 18 TO 21 | REFPIC_SA_#1 (AUSM) | START ADDRESS OF I-PICTURE #1 | |
| 22 TO 25 | REFPIC_EA_#1 (AUEM) | END ADDRESS OF I-PICTURE #1 | |
| ... | | | |
| 16+(n−1)×8 | REFPIC_SA_#n (AUSM) | START ADDRESS OF I-PICTURE #n | |
| 20+(n−1)×8 | REFPIC_EA_#n (AUEM) | END ADDRESS OF I-PICTURE #n | |
| | | TOTAL | 25+(n−1)×8 |

REFPIC_Ns: NUMBER OF I-PICTURES ("0" IF NO RANDOM ACCESS INDICATOR IS AVAILABLE)
REFPIC_SA#n: ADDRESS OF TS PACK INCLUDING FIRST TS PACKET OF I-PICTURE #n
(TS PACK WITH ACTIVE RANDOM ACCESS INDICATOR)
AUD (TS PACK WITH ACTIVE UNIT START INDICATOR)
REFPIC_EA#n: ADDRESS OF TS PACK INCLUDING LAST TS PACKET OF I-PICTURE #n
(TS PACK WITH ACTIVE UNIT START INDICATOR)
("0" IF NO UNIT START INDICATOR IS AVAILABLE)

(a) VOBU(SOBU) | VOBU(SOBU) | VOBU(SOBU) | VOBU(SOBU) | VOBU(SOBU) | VOBU(SOBU) | VOBU(SOBU)
  1 | 1 | 1 | 1 | 1 | 1
  33

TS PACK IN WHICH TS PACKET INCLUDING FIRST I_PICTURE IS ALIGNED TO HEAD OF PACK

INSERT PADDING PACKET TO ALIGN TS PACKET INCLUDING FIRST I-PICTURE TO HEAD OF PACK (b) VOBU(SOBU) | VOBU(SOBU) | VOBU(SOBU) | VOBU(SOBU) | VOBU(SOBU)
PAT PMT | PAT PMT | PAT PMT | PAT PMT
  32

TS PACK IN WHICH TS PACKET INCLUDING PAT IS ALIGNED TO HEAD OF PACK

INSERT PADDING PACKET TO ALIGN TS PACKET INCLUDING PAT TO HEAD OF PACK (c) CELL | CELL | CELL | CELL | CELL | CELL | CELL
SCD=0 | SCD=0 | SCD=0 | SCD=0 | SCD=0 | SCD=0 | SCD=0

TS PACK IN WHICH TS PACKET WITH SPLICE COUNTDOWN=0 IS ALIGNED TO HEAD OF PACK

INSERT PADDING PACKET TO ALIGN TS PACKET WITH SPLICE COUNTDOWN=0 TO HEAD OF PACK (a) STREAM BLOCK HEADER 11

(b) TRANSPORT PACKET INFORMATION 611 | STREAM BLOCK INFORMATION 612 | SECTOR DATA HEADER INFORMATION 613

(c) TRANSPORT PACKET INFORMATION 621 | RECORD TIME 622 | TRANSPORT PACKET ATTRIBUTION 623 | STREAM BLOCK SIZE 624 | STREAM BLOCK TIME DIFFERENCE 625 | FIRST ACCESS POINT 626 | TRANSPORT PACKET CONNECTION FLAG 627

(d) NUMBER OF TRANSPORT PACKET 631 | TRANSPORT PACKET MAPPING TABLE 632

(e) I-PICTURE MAPPING TABLE 641 | B,P-PICTURE START POSITION MAPPING TABLE 642 | VIDEO PACKET MAPPING TABLE 643 | AUDIO PACKET MAPPING TABLE 644 | PROGRAM SPECIFIC INFORMATION MAPPING TABLE 645

FIG. 25

(a) SECTOR DATA HEADER 12

(b) FIRST ACCESS POINT 651 | TRANSPORT PACKET CONNECTION FLAG 652

FIG. 26

CONSTRAINTS ON MPEG SPECIFICATIONS FOR SOB

| SYSTEM HEADER | SHALL NOT BE INCLUDED |
|---|---|
| SCR VALUE IN THE FIRST PACK OF A SOB | ANY VALUE |
| MPEG PROGRAM_END_CODE | SHALL NOT BE INCLUDED |
| STREAM_ID | SHALL BE EQUAL TO BFh (PRIVATE_STREAM_2) IN ALL PES PACKETS |

FIG. 27

STREAM FILE GENERAL INFORMATION (SF_GI)

|  | CONTENTS | NUMBER OF BYTES |
|---|---|---|
| (1) SOBI_Ns | NUMBER OF SOBIs | 2 |
| (2) SOBU_SIZ | NUMBER OF SECTORS PER SOBU | 2 |
| (3) MTU_SHFT | MAPPING TIME UNIT SHIFT | 1 |
| (4) RESERVED | RESERVED | 1 |
|  | TOTAL | 6 |

FIG. 31

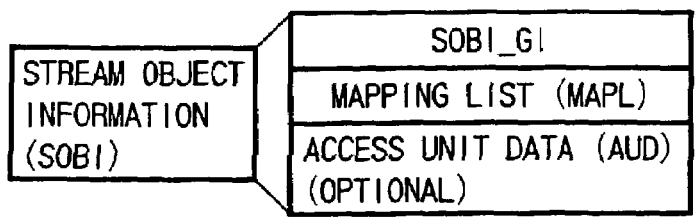

FIG. 32

STREAM OBJECT INFORMATION GENERAL INFORMATION (SOBI_GI)

|  | CONTENTS | NUMBER OF BYTES |
|---|---|---|
| (1) SOB_TY | SOB TYPE | 1 |
| (2) SOB_REC_TM | SOB RECORDING TIME | 5 |
| (3) SOB_STI_N | SOB STREAM INFORMATION NUMBER | 1 |
| (4) AUD_FLAGS | ACCESS UNIT DATA FLAGS | 1 |
| (5) SOB_S_APAT | SOB START APAT | 6 |
| (6) SOB_E_APAT | SOB END APAT | 6 |
| (7) SOB_S_SOBU | FIRST SOBU OF THIS SOB | 4 |
| (8) MAPL_ENT_Ns | NUMBER OF MAPPING LIST ENTRIES | 4 |
|  | TOTAL | 28 |

FIG. 33

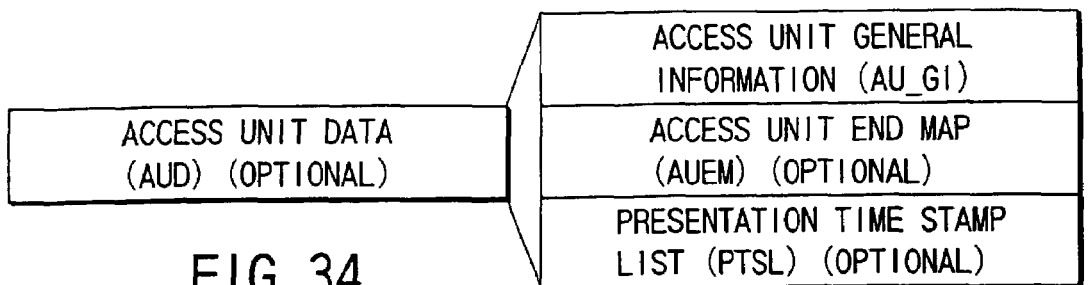
FIG. 34
ACCESS UNIT GENERAL INFORMATION (AU_GI)
| | | CONTENTS | NUMBER OF BYTES |
|---|---|---|---|
| (1) | AU_Ns | NUMBER OF ACCESS UNITS | 4 |
| (2) | AUSM | ACCESS UNIT START MAP (MAP_ENT_Ns ELEMENTS) | (MAPL_ENT_Ns+7) div 8 |
| | | TOTAL | (MAPL_ENT_Ns+7) div 8 + 4 |
FIG. 35
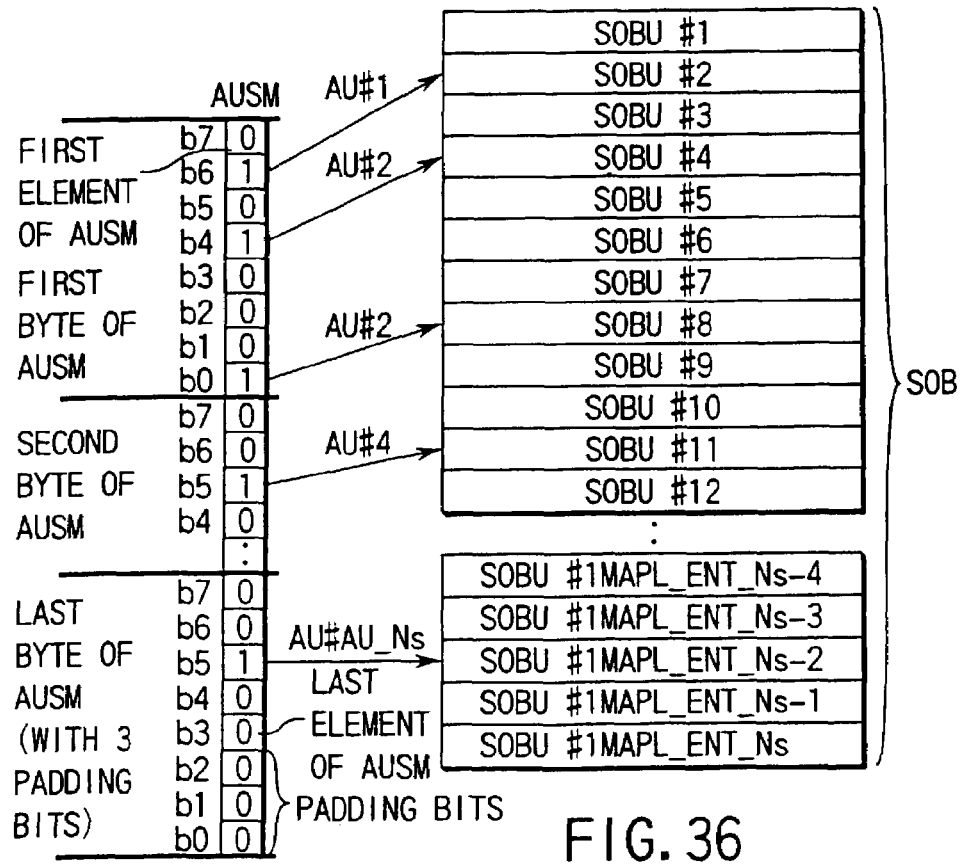
FIG. 36

STRUCTURE OF THE STREAM DATA AREA WITHIN A STREAM PES PACKET

APPLICATION HEADER

| FIELD | NUMBER OF BITS | NUMBER OF BYTES | VALUE | COMMENT |
|---|---|---|---|---|
| (1) VERSION | 8 | 1 | 01h | |
| (2) AP_Ns | 8 | 1 | | |
| (3) FIRST_AP_OFFSET | 16 | 2 | | |
| (4) EXTENSION_HEADER_INFO | 2 | | 00b,10b,11b | |
| (5) RESERVED FOR CCI_ESC | 1 | 1 | 0b OR 1b | |
| (6) RESERVED | 5 | | 11111b | |
| (7) SERVICE_ID | 16 | 2 | | |
| (8) MAX_BR_LOG2 | 8 | 1 | | |
| (9) SMO_BS_LOG2 | 8 | 1 | | |
| | TOTAL | 9 | | |

FIG. 40

DIGITAL VIDEO RECORDING SYSTEM AND ITS RECORDING MEDIUM

BACKGROUND OF THE INVENTION

The present invention relates to an improvement in a system for recording a digital video datastream and, more particularly, to a system capable of efficiently recording an MPEG transport stream to be digitally broadcasted. The present invention further relates to a system for recording support information of an MPEG transport stream in a management area.

In recent years, TV broadcast has entered an era of digital broadcast and, hence, the necessity of a streamer (an apparatus for saving digital data intact) for digital TV broadcast has come forth.

Digital TV broadcast currently uses an MPEG transport stream, which will probably become a standard in the field of digital broadcast of moving pictures in the near future.

As a streamer for recording digital broadcast data, for example, D-VHS (digital VHS) is available.

Digital TV broadcast data is broadcasted from a broadcast station via a communication satellite. The broadcasted digital data is received by a Set Top Box (to be abbreviated as an STB hereinafter as needed) set in each home, and is displayed on a TV monitor. This STB decrypts and plays back encrypted digital data on the basis of a key code distributed from the broadcast station.

Data is encrypted to prevent a user who does not have any contract with the broadcast station from illicitly receiving and viewing that data.

When the received data is directly played back, it is decrypted by the STB. The decrypted data is decoded by an MPEG decoder, and the decoded data is converted into a TV signal by a video encoder to be displayed on a TV monitor.

When broadcast data is recorded, digital data received by a tuner is recorded by a D-VHS recorder via an IEEE1394 digital interface.

Note that IEEE1394 specifies standard interface specifications, that implement command and data exchanges.

When recorded broadcast data is played back, the recorded data is read from the D-VHS recorder, and is sent to a data expansion unit in the STB, thus playing back the recorded data.

Digital data recorded by the D-VHS recorder normally has the following structure.

That is, digital data to be recorded is recorded as main data in a sync block in a main data area, while six tracks are handled as one ECC block. In this case, a header is appended to a transport stream (TS) packet upon recording.

In such D-VHS streamer, the broadcasted bitstream is directly recorded on tape. For this reason, a plurality of multiplexed programs are recorded on the tape.

Hence, all data are output from the tape upon playback irrespective of the playback start position. The STB selects only a desired program from the output data and plays it back.

Such system suffers very poor random-access performance, since a tape medium is used to record. For this reason, even when the user wants to quickly reach a desired position of a given program to play it back, such random access is impossible to attain.

On the other hand, even in large-capacity disc media such as DVD-RAMs and the like, recording of a streamer suffers certain problems. To realize random access, special playback, and the like, such DVD system inevitably requires to record management data together with broadcast data.

Also, in such DVD system, data must be managed or formatted in accordance with the DVD video format.

However, since the DVD video format does not assume satellite broadcast, it cannot often support special playback or the like.

Japanese Patent Application No. JP10-040876 has proposed the format that assumes a home recorder/player. However, even in this format, digital broadcast is not taken into consideration.

As mentioned above, in a digital TV broadcast compatible streamer system, TS stream data cannot be efficiently managed in a streamer that uses a DVD-RAM capable of random access, i.e., a read/write (R/W) disc.

BRIEF SUMMARY OF THE INVENTION

It is an object of the present invention to provide a system that can efficiently record a transport packet in a streamer which uses media (DVD-RAM and the like) capable of random access.

It is another object of the present invention to add a streamer function to the DVD video format.

It is still another object of the present invention to efficiently manage digital TV broadcast data by proposing a novel format that assumes digital TV broadcast.

To achieve the object, the present invention uses information medium (including a signal or radio wave) which comprises an data object (VOB/SOB) formed of one or more data object units (VOBU/SOBU) each of which serves as a prescribed data unit; control information (VOBUI/SOBI) of the data object (VOB/SOB); access unit data (AUD) used for accessing an access unit (I-picture, etc.) which is a part of contents of the data object (VOB/SOB), the access unit data (AUD) being contained in the control information (VOBUI/SOBI); and a bitstream being formed of a series of packets, the bitstream including contents of the data object (VOB/SOB) and contents of the control information (VOBUI/SOBI).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 illustrates explanatory views showing the description contents of PGCI shown in FIG. 6;

FIG. 8 shows a table including the description contents of C_PBI shown in FIG. 6;

FIG. 10 shows a table including the description contents of VOBUI shown in FIG. 9;

FIG. 11 illustrates explanatory views showing an example of the format structure of a VOBU or cell shown in FIG. 6;

FIG. 25 shows the internal structure of the stream block header as shown in FIG. 24;

FIG. 26 shows an internal structure of the sector data header shown in FIG. 24;

FIG. 27 describes constraints on MPEG specifications for SOB;

FIG. 31 shows the contents of Stream File General Information SF_GI shown in FIG. 30;

FIG. 32 shows the structure of Stream Object Information (SOBI#) shown in FIG. 30;

FIG. 33 shows the contents of Stream Object Information General Information SOBI_GI shown in FIG. 32;

FIG. 34 shows the structure of Access Unit Data AUD shown in FIG. 32;

FIG. 35 shows the contents of Access Unit General Information AU_GI shown in FIG. 34;

FIG. 36 illustrates an example of correspondence between Access Unit Start Map AUSM (cf. FIGS. 8 and 10) and stream object units SOBUs (cf. FIGS. 2, 4, and 11);

FIGS. 8 and 10) with Access Unit End Map AUEM (cf. FIGS. 8 and 10) and stream object units SOBUs (cf. FIGS. 2, 4, and 11);

FIG. 40 shows the contents of the application header at the start of the stream data area shown in FIG. 39.

DETAILED DESCRIPTION OF THE INVENTION

A DVD recorder/player and the format of an optical disc on which the DVD recorder/player can write data according to an embodiment of the present invention will be described below with reference to the accompanying drawings.

The terminology of the format will be briefly explained first. Data is saved on an optical disc in a normal file format. A title corresponds to a single movie, and a plurality of titles are stored in a single disc. A group of titles is called a title set, which is formed of a plurality of files. Also, a file called a video manager (to be abbreviated as VMG hereinafter) is stored on a single disc as information for managing this disc.

Furthermore, the title set (to be referred to as VTS hereinafter) is composed of a management information file of video title set information (to be referred to as VTSI hereinafter), and a backup file of the VTSI.

The video file has a hierarchical structure, and a single file is formed of a plurality of program chains, each of which comprises a plurality of programs, each of which comprises a plurality of cells, each of which comprises a plurality of video object units (to be referred to as VOBUs hereinafter). Each VOBU is formed of a plurality of packs including various kinds of data. Each pack is formed of more than one packets and a pack header. The pack is a minimum unit for a data transfer process. Furthermore, the minimum unit for a logic process is a cell, and the logic process is done in units of cells.

A transport (TS) stream will be explained below. In general, in a method of broadcasting compressed moving pictures (e.g., digital TV broadcast, cable broadcast such as the Internet, and the like), a TS stream as a common basic format is specified to comply with the MPEG2 specifications.

Figure 1:
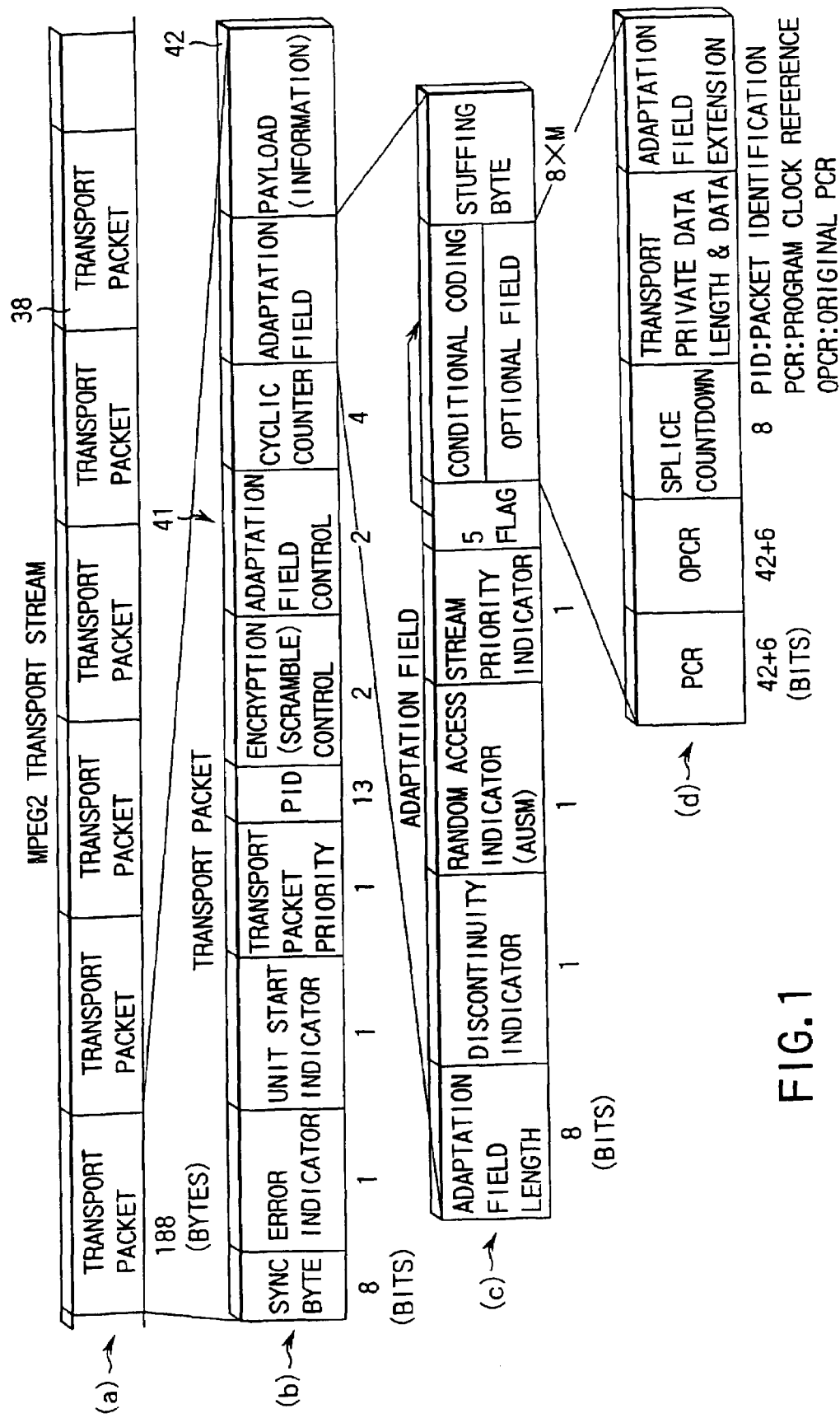
FIG. 1 illustrates explanatory views showing the format of an MPEG TS stream.

The TS stream is composed of a large number of TS packets 38, as shown by (a) in FIG. 1. Each TS packet 38 has a structure shown by (b) to (d) in FIG. 1 and is formed of packet management data field 41 and payload 42, as shown by (b) in FIG. 1. Payload 42 stores encrypted data to be played back.

Data to be played back stored in payload 42 includes MPEG video data, Dolby AC3 audio data, MPEG audio data, and the like. On the other hand, information other than the data to be directly played back includes a program association table (PAT), a program map table (PMT), and the like which are required upon playing back data, and also electronic program guide (EPG) information.

The PAT includes packet identification information (PID) of PMTs in units of programs, and each PMT records the PID of video data, audio data, or the like.

With this format, as a normal playback procedure of an STB, when the user determines a program based on EPG information, a PAT is loaded at the start time of the determined program, and the PID of a PMT of the determined program on the basis of the PAT. The desired PMT is read out based on the determined PID, the PIDs of video and audio packets included in the PMT are determined, and the video and audio data are extracted and played back according to the PIDs. Note that the PAT is sent at intervals of several 100 ms since it is also used in the course of playback.

When such TS stream data are recorded on a disc medium such as a DVD-RW (read/write) or the like, these data are preferably recorded as digital data. However, since the current maximum bit rate of a DVD-RAM is 10.08 Mbps, satellite broadcast data (20 Mbps or more) itself in which all channels are multiplexed cannot be recorded. For this reason, when such data are recorded, one program must be selected and recorded.

When certain data are recorded on a disc medium, other data for managing recorded data are required to meet user needs (e.g., to start playback from a desired time of a desired program, to fast forward, and the like). However, since the data itself to be played back is encrypted, it is hard to generate management data for the data itself to be played back.

For this reason, management data is preferably generated using data in a packet header as control data in a TS stream packet, or data in a PAT or PMT packet as PSI (program specific information) data of a TS stream.

Note that such packet header contents may often include information which is not supported depending on the types of satellite broadcast, and may often use neither a PAT nor PMT. Hence, management data cannot often be generated in units of satellite broadcast services by the aforementioned method, and data cannot be recorded.

To solve this problem, upon recording, information of a packet header used by satellite broadcast, and information indicating the presence/absence of a PAT or PMT are saved in management information, and management data is generated in accordance with supported information. To provide only available services upon playback, service contents are preferably changed in accordance with that support information.

As a method of detecting support information, the following two methods can be used.

In the first method, support information is received from the STB. The STB varies in units of satellite broadcast services to be received, and is a dedicated apparatus. For this reason, the STB should recognize information pertaining to support in advance (upon delivery of STB). Hence, that support information is loaded from the STB at the beginning of recording.

In the second method, each data to be used is checked upon receiving TS stream data from the STB, and if that data is active, it is determined that the information is supported, and the support information is stored. At the same time, management data is generated based on the supported information, and the accumulated support information is recorded in a management area of an optical disc as management data.

The format that includes support information in management data will be explained below. The first example will explain management data that manages data complying with the DVD video format for which the format specifications have already been standardized.

Current DVD video format does not assume satellite broadcast or the like. Hence, when satellite broadcast data is recorded and the recorded data is played back in special modes, some special modes can not be supported in the status. Hence, to propose recording/playback specifications that comply with current DVD video, the following format is optimal.

Figure 2:
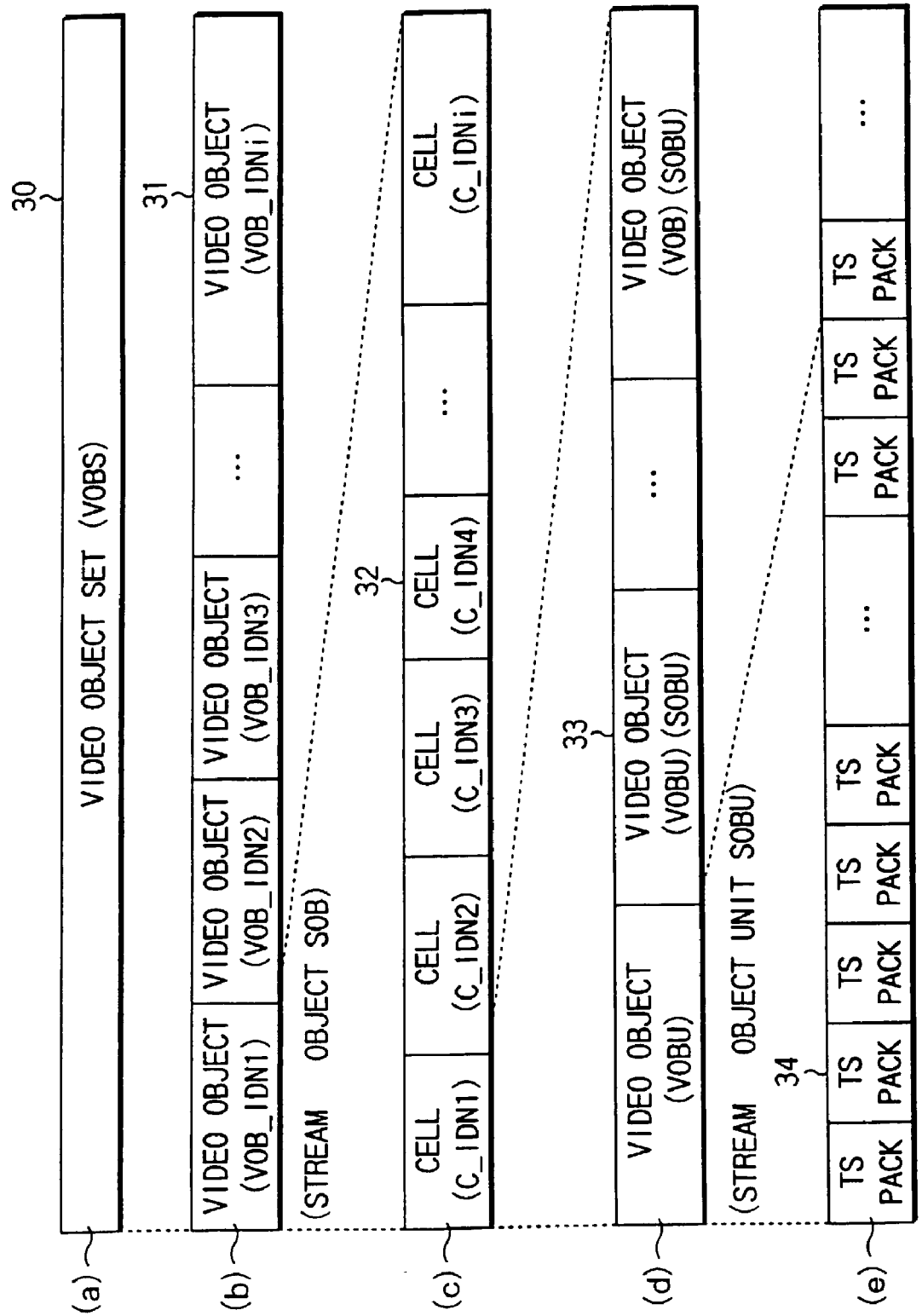
FIG. 2 illustrates explanatory views showing the format of an object set which is recorded/played back by a DVD recording/playback system according to the present invention.

In current DVD video, video object set (VOBS) 30 as an object to be played back has a structure shown by (a) to (d) in FIG. 2.

More specifically, VOBS 30 shown by (a) in FIG. 2 is defined as one or a set of a large number of video objects (VOBs) 31, as shown by (b) in FIG. 2, and each VOB 31 is defined as one or a set of a large number of cells 32, as shown by (c) in FIG. 2. Furthermore, cell 32 is defined as one or a set of a large number of video object units (VOBUs) 33, as shown by (d) in FIG. 2. VOBU 33 is formed of one or a large number of TS packs 34, as shown by (e) in FIG. 2.

In a streamer, streamer objects (SOBs) are defined as those corresponding to the VOBs, and streamer object units (SOBUs) are defined as those corresponding to the VOBUs.

In the following, descriptions pertaining to the VOB and VOBU may be interpreted by replacing them by the SOB and SOBU, respectively, as needed.

As for the structure of VOBU 33, two different format schemes can be proposed.

Figure 3:
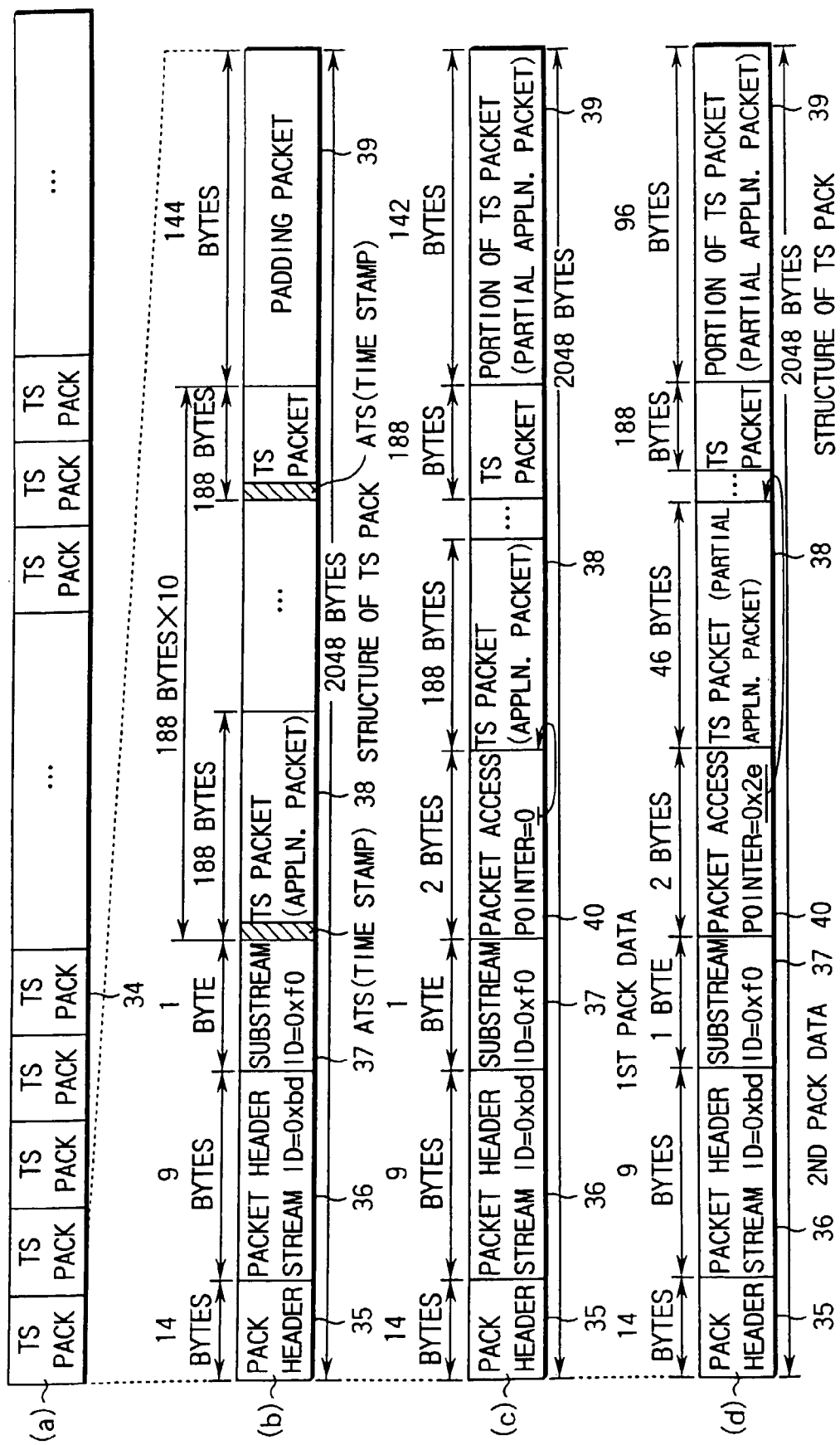
FIG. 3 illustrates explanatory views showing the format structure of a TS pack shown in FIG. 2.

In the first scheme, one VOBU 33 is composed of one or more TS packs 34 that record transport streams (TS streams). One TS pack 34 shown by (a) in FIG. 3 is formed of pack header 35, packet header 36, substream ID 37, and transport packets (TS packets) 38, as shown by (b) in FIG. 3. The size per TS pack 34 is determined to be 2,048 bytes, and if the pack is smaller than 2,048 bytes, padding packet 39 is inserted to adjust the size.

Each TS pack 34 is formed of 10 TS packets 38, and packet header 36 includes a stream ID that describes 0xbd indicating a private stream in MPEG2. Also, a substream ID that specifies that data in a packet is a transport stream describes 0xf0.

Incidentally, a timestamp (ATS) may be placed at the leading portion of each of the TS packets, as shown by (b) in FIG. 3.

As shown by (c) in FIG. 3, the second scheme has a packet structure in which 2-byte packet access pointer 40 is inserted after substream ID 37 in the packet structure of (b) in FIG. 3. The packet access pointer 40 indicates the start address of head packet 38 in pack 34.

For example, in (c) of FIG. 3, since head packet 38 in pack 34 is inserted immediately after packet access pointer 40, its relative address is zero. In pack 34 shown by (c) of FIG. 3, since last packet 39 has only 142 bytes while each of other packets has 188 bytes, remaining 46 bytes are stored in next pack 34 shown by (d) of FIG. 3.

In pack 34 shown by (d) of FIG. 3, since the remaining 46 bytes are inserted immediately after packet access pointer 40, last packet 39 is located after the remaining 46 bytes. Hence, "0x2e" indicating the address of last packet 39 is described in packet access pointer 40 of next pack 34.

With this packet access pointer 40, a field that must store padding data and cannot be used can be used as a storage field of packet data. At this time, if the packet access pointer is 0xffff, it indicates that the head packet is not present within a pack.

In this case, the head packet must be aligned after packet access pointer 40, as shown in the example of (c) in FIG. 3. With this structure, packets can be managed in units of VOBUs, and a packet which has a size that cannot fall within one pack can be coped with.

Portions of a transport stream packet (TS packet) shown by (c) and (d) in FIG. 3 correspond to the following case.

That is, when one packet is recorded across two sectors upon recording a TS packet, data pieces recorded in the first and second sectors, respectively, correspond to portions of the TS packet.

With this format, when one packet is recorded across two sectors, no padding data need be inserted, thus increasing the recording density.

In this case, a packet header can record position information indicating "the number of bytes from a reference position to the first TS start position of each sector". As the reference position, for example, the position of a packet header, the head position of a TS packet, the end position of a TS packet, or the adjacent boundary position of successive adjacent TS packets, may be used.

When the head position of a TS packet is used as the reference position, packet access pointer=0 in (c) of FIG. 3 can be used as the position information.

When the end position of a TS packet (or the adjacent boundary position) is used as the reference position, packet access pointer=0x2e in (d) of FIG. 3 can be used as the position information.

Figure 4:
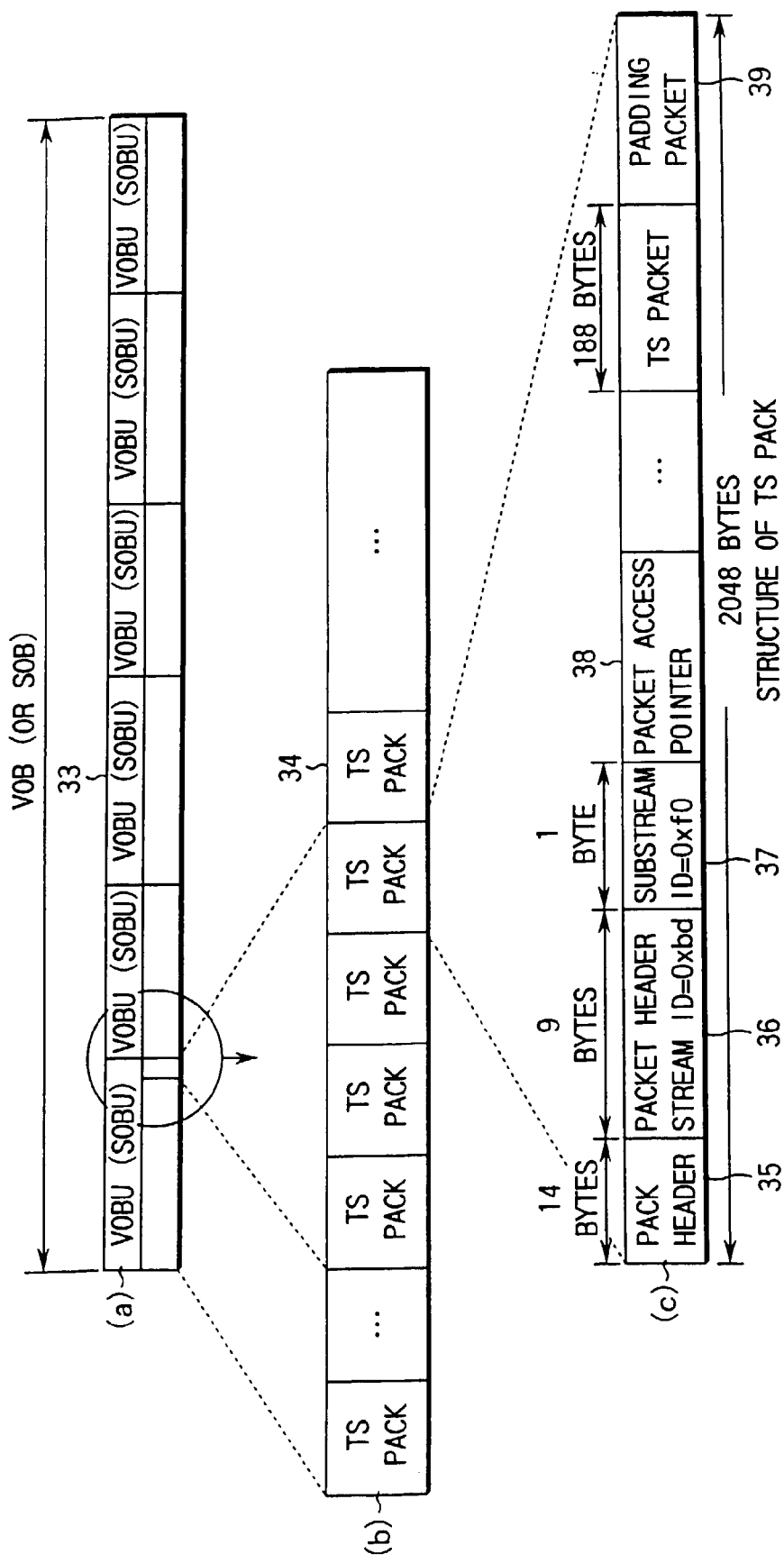
FIG. 4 illustrates explanatory views showing the structure of a VOBU which is optimal to the pack structure shown in FIG. 3.

An example of the second scheme that has already been explained will be described in more detail below with reference to FIG. 4. VOBU (or SOBU) 33 shown by (a) in FIG. 4 is formed of an integer number of TS packs 34, and head TS pack 34 in VOBU (SODU) 33 has the structure shown by (c) in FIG. 4.

More specifically, the head portion of TS packet 38 is always aligned after packet access pointer 40 in TS pack 34, and packet access pointer 40 stores zero relative address. Hence, when VOBU (SOBU) 33 is accessed to extract that packet, the head of that packet matches that of TS packet 38, and TS packet 38 can be extracted and immediately transferred. TS packets 38 are arranged after head TS pack 34 in VOBU (SOBU) 33, and the remaining portion of TS packet 38 that cannot be stored in one pack with 2,048 bytes is stored in packet 38 of next TS pack 34, as shown by (c) in FIG. 4.

In this manner, TS packs 34 are arranged in turn in VOBU (SOBU) 33. Last TS pack 34 in that VOBU (SOBU) 33 cannot often store one TS packet 38 at the end of that pack unlike other TS packs 34, as shown by (c) in FIG. 4.

In such case, padding packet 39 can be inserted in that end portion, as needed. By inserting the padding packet, head TS pack 34 in next VOBU (next SOBU) 33 can have a packet data field starting from head TS packet 38.

Note that a method that can cope with the aforementioned case without using any padding packet (one packet is recorded across two sectors upon recording a TS packet) is also available, and has already been explained.

In the example shown in FIGS. 3 and 4, packet access pointer 40 designates the address of first TS packet 38 in that pack 34, and TS packet 38 to be extracted first in that pack 34 can be specified when pack 34 is designated by packet access pointer 40.

Figure 5:
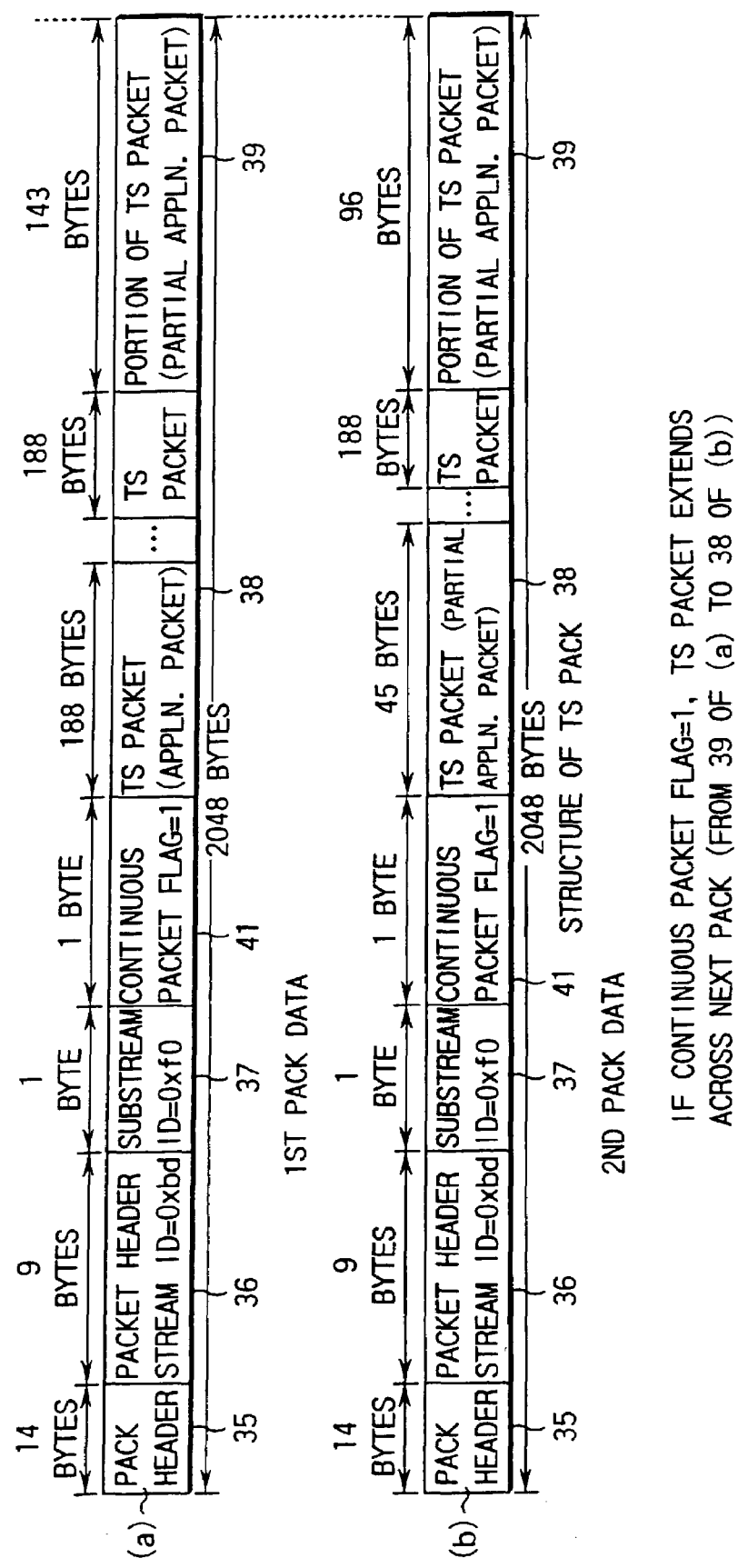
FIG. 5 illustrates explanatory views showing the structure according to a modification of the TS pack shown in FIG. 3.

The structure of next TS pack 34 may be specified by a continuous packet flag shown by (a) and (b) in FIG. 5, in place of packet access pointer 40.

More specifically, as shown by (a) in FIG. 5, substream ID 37 that specifies TS packets is inserted after packet header 36 in TS pack 34, and continuous packet flag 41 is inserted after the substream ID. Continuous packet flag 41 indicates whether or not TS pack 34 that follows TS pack 34 including that flag stores a portion of TS packet 39.

That is, if continuous packet flag 41 is 1, a portion of TS packet 39 is stored at the end of that TS pack 34, and the remaining portion of that TS packet 39 is stored after continuous packet flag 41 in next TS pack 34.

If a TS packet 39 is aligned and arranged at the end of TS pack 34 and no portion of that packet remains to be stored in next pack 34, zero continuous packet flag 41 is set. This means that if TS packet 39 with zero continuous packet flag 41 is acquired, a smooth playback process is assured by playing back TS packet 39 that follows continuous packet flag 41.

The structure of management data in the aforementioned data structure will be described below.

Figure 6:
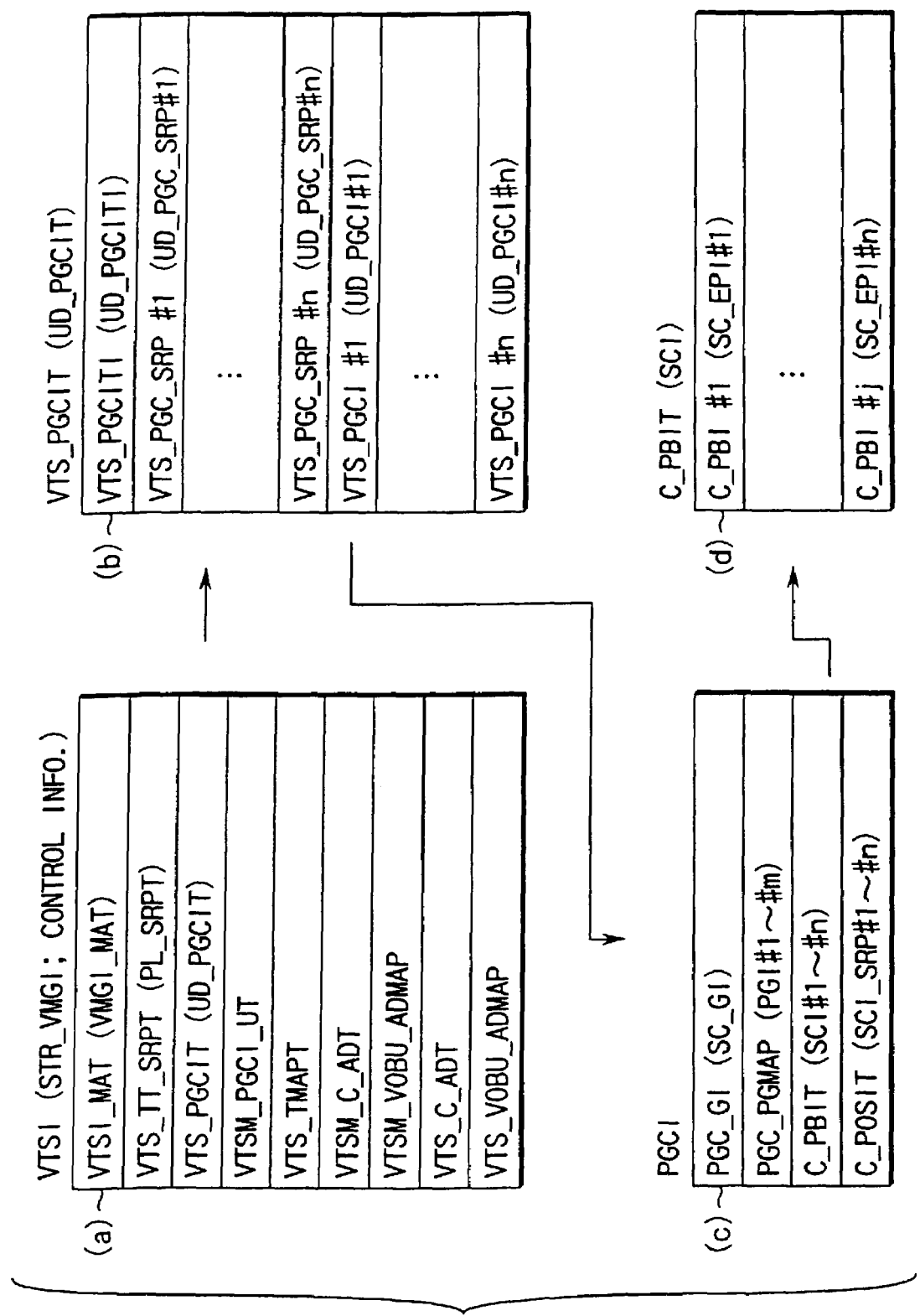
FIG. 6 illustrates explanatory views showing an example of the format of management information which is used to manage a video object set (FIG. 2) as an object to be played back.

Management data is recorded in a management area after a lead-in area on the inner periphery side of an optical disc, and the management area includes a table of video title set information (VTSI) or a table of streamer control information (STR_VMGI), as shown by (a) in FIG. 6. The STR_VMGI is contained in management information (STRI) of a streamer, and the STRI has functions corresponding to those of the VTSI.

As shown by (a) in FIG. 6, this VTSI (STR_VMGI) includes a VTSI management table (VTSI_MAT) that describes management information pertaining to the VTSI (STR_VMGI); a VTS search pointer table (VTS_TT_SRPT) that describes search pointers used to search for a VTS (video title set) or a play list search pointer table (PL_SRPT) that describes search pointers used to search for a play list in a stream; a VTS program chain information table (VTS_PGCIT) that specifies the cell playback order or a user-defined program chain information table (UD_PGCIT); a VTS menu program chain information unit table (VTSM_PGCI_UT); a VTS time map table (VTS_T-MAPT); a VTS menu cell address table (VTSM_C_ADT); a VTS menu VOBU address map table (VTSM_VOBU_ADMAP); a VTS cell address table (VTS_C_ADT); and a VTS VOBU address map table (VTS_VOBU_ADMAP) in this order.

User-defined PGC information (UD_PGCI) in the UD_PGCIT is a sequence of parts of a program. The play list may be used by a user to freely define the playback sequence of the parts of programs.

The VTS_PGCIT (UD_PGCIT) contains VTS_PGCIT information (VTS_PGCITI) (or UD_PGCITI); VTS program chain search pointers (VTS_PGC_SRP#n) (or UD_PGC_SRP#n) arranged in the playback order, and VTS program chain information (VTS_PGCI#n) (or UD_PGCI#n) designated by each of these search pointers, as shown by (b) in FIG. 6.

As shown by (c) in FIG. 6, the VTS_PGCI#n (or UD_PGCI#n) is made up of program chain (PGC) general information (PGC_GI) or stream cell general information (SC_GI); a PGC program map (PGC_PGMAP) or program information (PGI#m); a cell playback information table (C_PBIT) that describes information pertaining to cell playback, or stream cell information (SCI#n); and a cell position information table (C_POSIT) that describes cell position information, i.e., address information or stream cell information search pointers (SCI_SRP#n). The C_PBIT (SCI#n) is formed of a number of pieces of cell playback information (C_PBI#j) which are arranged in the cell playback order, or a number of pieces of stream cell entry point information (SC_EPI#n), as shown by (d) in FIG. 6.

The PGC general information (PGC_GI) may have a configuration as shown by (a) in FIG. 7. The PGC_GI describes: PGC contents (PGC_CNT) such as the number of programs, the number of cells and the like; a PGC transport time (PGC_TRS_TM) that describes the recording or transport time of one PGC; support information; the start address (PGC_PGMAP_SA) of a PGC program map (PGC_PG-MAP); the start address (C_PBIT_SA) of a cell playback information table (C_PBIT); the start address (C_POSIT_SA) of a cell position information table (C_POSIT); and an erasure inhibition flag (ARCHIVE Flag).

In case of SC_GI, a cell type (C_TY1=010b) and a temporary erase (TE) flag are described in place of the ARCHIVE Flag. This SC_GI may further includes:

SC_EPI_Ns which describes the number of Entry Point Information contained in the SCI;

SOB_N which describes the number of SOBs to which the cell refers;

SC_S_APAT which describes the Start Application Packet Arrival Time (Start APAT) of the cell in DVD Stream Recording's PAT Describing Format;

SC_E_APAT which describes the End Application Packet Arrival Time (End APAT) of the cell in DVD Stream Recording's PAT Describing Format (The End APAT is the APAT of the last Application Packet which belongs to the cell.);

ERA_S_APAT which describes, for a "Temporarily Erased" cell containing at least one SOBU border (the "TE" field of its C_TY is "10b"), the APAT of the first Application Packet of the first SOBU, the beginning of which is contained in the TE cell;

ERA_E_APAT which describes, for a "Temporarily Erased" cell containing at least one SOBU border (the "TE" field of its C_TY is "10b"), the APAT of the first Application Packet of that SOBU which contains the Application Packet immediately following the TE cell.

As the flow of signals upon recording, TS packet data received by the STB are packed and recorded by a formatter unit. At this time, the presence/absence of each information is detected and is saved in a work RAM. The saved information is recorded as management information upon completion of recording.

In the support information, as shown by (b) in FIG. 7, bit b0 records a random access indicator support flag indicating whether or not random access is permitted, and bit b1 a unit start indicator support indicating whether or not start is permitted for each unit. Bit b2 records a PAT/PMT support indicating whether or not the PAT (program association table) and PMT (program map table) are supported, bit b3 a PCR support indicating whether or not PCR (Presentation Clock Reference) is supported, bit b4 an SCD (Splice CountDown) support indicating whether or not SCD is supported, and bits b5 to b7 an identification code of the STB which recorded data.

The identification code includes, e.g., an STB (001) of BS digital broadcast, a Ver2 STB (010) of DirecTV, and a Ver1 STB (011) of Sky Perfect TV.

Upon playback, pack data read out from a disc is interpreted by a distributor, and a pack that stores TS packets is sent to a TS packet transfer unit. The TS packet transfer unit transfers only TS packets to the STB in accordance with a request from the STB.

Each cell playback information (C_PBI) (or stream cell information SCI) preferably further describes support information, as shown in FIG. 8.

More specifically, as shown in FIG. 8, the cell playback information (C_PBI) records: a cell category (C_CAT) (or cell type C_TY) in the 0th byte (relative byte position: RBP); a cell arrival time (C_ARL_TM) which describes an STC value or PCR upon recording the head of the cell of interest in the 1st to 4th bytes (RBP); the start address (C_FVOBU_SA) of the first VOBU in the cell in the 5th to 8th bytes (RBP); the start address (C_LVOBU_SA) of the last VOBU in the cell in the 9th to 12th bytes (RBP); and the end address (C_LVOBU_EA) of the last VOBU in the cell in the 13th to 16th bytes (RBP).

Also, the cell playback information describes a TS packet length indicating the length of a transport stream packet (TS packet) in the 17th and 18th bytes (RBP).

Furthermore, the cell playback information (or SCI) records the number of I-pictures (REFPIC_Ns) (or the number of access units AU_Ns) as support information in the 19th to 22nd bytes (RBP).

Moreover, the cell playback information (or SCI) records the start addresses (REFPIC_SA#1 to REFPIC_SA#n) and end addresses (REFPIC_EA#1 to REFPIC_EA#n) of I-pictures (or Access Unit Start Map AUSM and Access Unit End Map AUEM) in turn in the 23rd byte and subsequent bytes (RBP).

REFPIC_SA# (I-picture start position) corresponds to an AUSM (access unit start map; to be described later). This AUSM indicates a data unit (SOBU) of a streamer object (SOB), which unit contains an access unit (AU).

REFPIC_EA# (I-picture end position) corresponds to an AUEM (access unit end map; to be described later). This AUEM is a bit array having the same length as that of the AUSM. Bits in this AUEM indicate which of the SOBUs contains the end of a bitstream segment associated with the access units of the SOB.

Note that the SOB and SOBU are names used in a streamer, and correspond to names VOB and VOBU used in DVD video (DVD_RTR).

The streamer directly records an incoming bitstream, and does not concern itself with its contents (that is, the streamer does not know the recording contents).

When a bitstream recorded by the streamer is an MPEG2 transport stream, decoding starts from an I-picture position. In this case, if a time search is made for a position between a given I-picture and the next I-picture (i.e., access is made based on only the time stamp), since there is no I-picture at that position, the start of decoding delays until the next I-picture is detected (thus the image output timing delays).

On the other hand, when a data unit (SOBU) is used as an access unit in the streamer, since the start/end positions of I-picture can be determined in units of SOBUs (i.e., determined from the AUSM and AUEM), an I-picture position can be immediately found by a time search using an MPEG transport stream.

That is, when the SOBU is used for the access unit, an I-picture position is immediately found by a time search. Therefore, decoding can be quickly started, and smooth fast forward (FF) and fast rewind (FR) can be attained.

Note that the TS packet length is described in FIG. 8. When 188-byte TS packets are transferred in turn, no problem will be posed even if the TS packet length is unknown. However, some broadcast station may send a TS packet which has a size equal to or larger than 188 bytes to the streamer. According to the present embodiment, the packet length can be set in consideration of such special case.

Thus, after data is read out from a disc, the data packet in the pack is segmented by the TS packet length to obtain packets.

When packets corresponding to the TS packet size (188 bytes) in an MPEG transport stream, the packet size in a DVD video (DVD_RTR) program stream, and other packet sizes (n bytes/packet) are considered as those to be recorded by the streamer, a generic bitstream called an application stream is used.

As another example, a case will be exemplified below wherein support information is recorded in management information in the currently proposed recording/playback video format.

Figure 9:
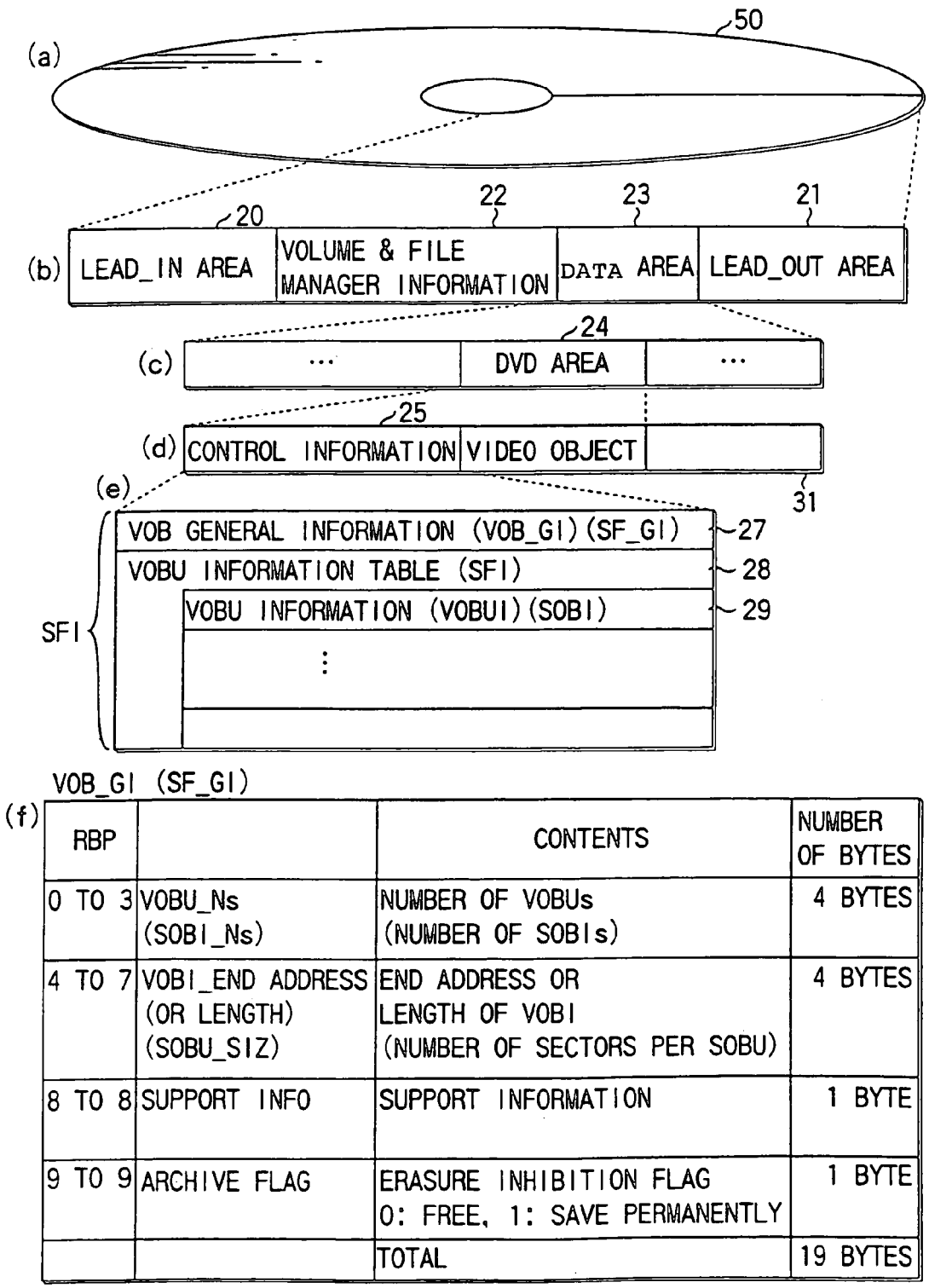
FIG. 9 illustrates explanatory views showing another example of the format of management information which is used to manage a video object (FIG. 2) as an object to be played back.

FIG. 9 shows an outline of the format. Reference numeral 50 denotes a RAM video disc that allows recording, erasure, and playback. A recording area of the disc shown by (a) in FIG. 9 is defined between lead-in area 20 and lead-out area 21, as shown by (b) in FIG. 9. In this area, volume & file manager information area 22 and data area 23 are assigned.

Data area 23 is divided into a plurality of DVD areas 24, as shown by (c) in FIG. 9. As shown by (d) in FIG. 9, each DVD area 24 is made up of control information 25 and video object 31 with the structure shown in FIG. 2. Further, as shown by (e) in FIG. 9, control information 25 is made up of VOB general information (VOB_GI) (or stream file general information SF_GI) 27, and VOBU information table (or stream file information SFI) 28 which includes a number of pieces of VOBU information (VOBUI) (or stream object information SOBI) 29.

VOB general information (VOB_GI) (or SF_GI) 27 has areas for recording VOBU_Ns (or SOBI_Ns), VOBI_End Address (or SOBU_SIZ), support information, etc., as shown by (f) in FIG. 9.

More specifically, VOB_GI (or SF_GI) records: the number of VOBUs (VOBU_Ns) (or the number of SOBIs (SOBI_Ns)) in the 0th to 3rd bytes (RBP); the end address or the size (i.e., length) of the VOBI (or the number of sectors per SOBU (SOBU_SIZ)) in the 4th to 7th bytes (RBP); and support information which may be the same as that shown by (b) in FIG. 7 in the 8th byte (RBP). Furthermore, an erasure inhibition flag (ARCHIVE Flag) can be recorded in the 9th byte (RBP).

VOBUI (or SOBI) 29 shown by (e) in FIG. 9 can record support information shown in FIG. 10.

More specifically, VOBUI (SOBI) 29 records: the VOBU start address in the 0th to 3rd bytes (RBP); and the VOBU end address or length in the 4th to 7th bytes (RBP).

Also, VOBUI (SOBI) describes: a system time clock (STC) or program clock reference (PCR) upon recording the head of the VOBU of interest as VOBU_RECTM in the 8th to 11th bytes (RBP); and a TS packet length indicating the length of a TS packet in the 12th and 13th bytes (RBP).

Furthermore, VOBUI (SOBI) records the number of I-pictures (REFPIC_Ns) in the 14th to 17th bytes (RBP).

Moreover, VOBUI (SOBI) records the start addresses (REFPIC_SA) and end addresses (REFPIC_EA) of I-pictures in turn in the 18th byte and the subsequent bytes (RBP).

When a VOBU is segmented into a plurality of sets of TS packets to always locate an I-picture at the head of each set, the I-picture address is used upon segmenting the VOBU.

REFPIC_SA# in FIG. 10 corresponds to the aforementioned AUSM (access unit start map), and REFPIC_EA# corresponds to the aforementioned AUEM (access unit end map).

In this way, when an I-picture is always located at the head in a VOBU, the I-picture start address need not be described, and only the I-picture end address can be described.

As an example for recording management data contained in the TS packet described above in the aforementioned tables, the following five pieces of information will be explained.

The first information is the random access indicator contained in the TS packet header shown by (c) in FIG. 1, which is activated in case of a TS packet containing first I-picture data.

With this flag, the start position of the I-picture can be specified. Two methods are available to reflect this flag on the format.

In the first method, formatting is done using this information upon segmenting data into VOBUs (or SOBUs) 33, as shown by (a) in FIG. 11.

With this method, since the start position of each VOBU (SOBU) always matches that of an I-picture, playback in units of VOBUs (SOBUs) can be easily done. In this case, a padding packet is inserted into a VOBU (SOBU) as needed to always locate I-picture data at the start position in the VOBU (SOBU), as shown by (a) in FIG. 11.

As the second method, when the start positions of I-pictures are recorded in the management area, as shown in FIGS. 8 and 10, they can be used in a special playback mode such as FF, FR, or the like, as will be described later.

In an actual system, since an I-decode end interrupt from the STB must be used, extra data is sent to the STB if only the I-picture start address is used, resulting in poor efficiency.

Furthermore, as the second information, the unit start indicator shown by (b) in FIG. 1 is supported.

Thus, since the I-picture end address can be specified, a special playback mode such as fast forward (FF), fast rewind (FR), or the like that does not read out extra data can be implemented.

The unit start indicator can specify the start address of each I-picture. The I-picture end address is written as management information, as shown in FIGS. 8 and 9.

In this embodiment, a logical block address is used as address information. The logical block address does not match an actual physical address since skipping is done based on, e.g., error information and the like. Especially, in case of a DVD-RAM or the like, since an error occurs due to contamination such as scratches, fingerprints, and the like, the addresses may have a larger difference. For this reason, the logical block address is converted into a physical address by, e.g., a file system.

Also, as the address information, not only the logical block address but also a method of indicating an address using a transfer time, converting the time information into a logical block address using a correspondence table, and then converting the logical block address into a physical address may be used. That is, the address information indicates information that can be converted into a physical address with reference to a correspondence table or the like or via computations.

Figure 13:
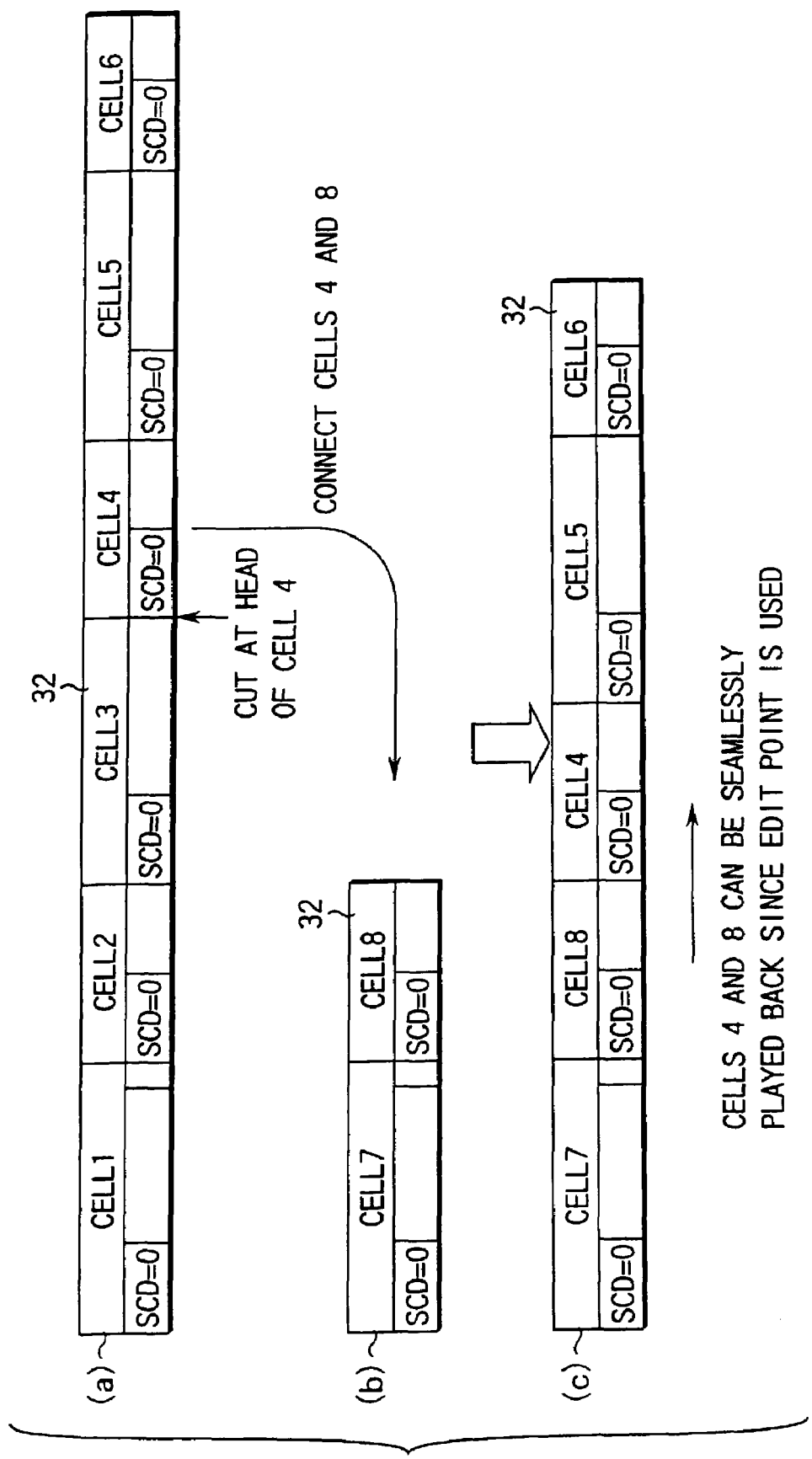
FIG. 13 illustrates views for explaining an edit process using the cell format structure shown in FIG. 6.

The third information is a splice countdown (SCD) contained in the TS packet header shown by (d) in FIG. 1, by (c) in FIG. 11, and by (a) to (c) in FIG. 13, which can specify an editable position. That is, if logical minimum units (corresponding to cells in DVD) are segmented using this unit, this information can be used in editing from each minimum unit.

Figure 12:
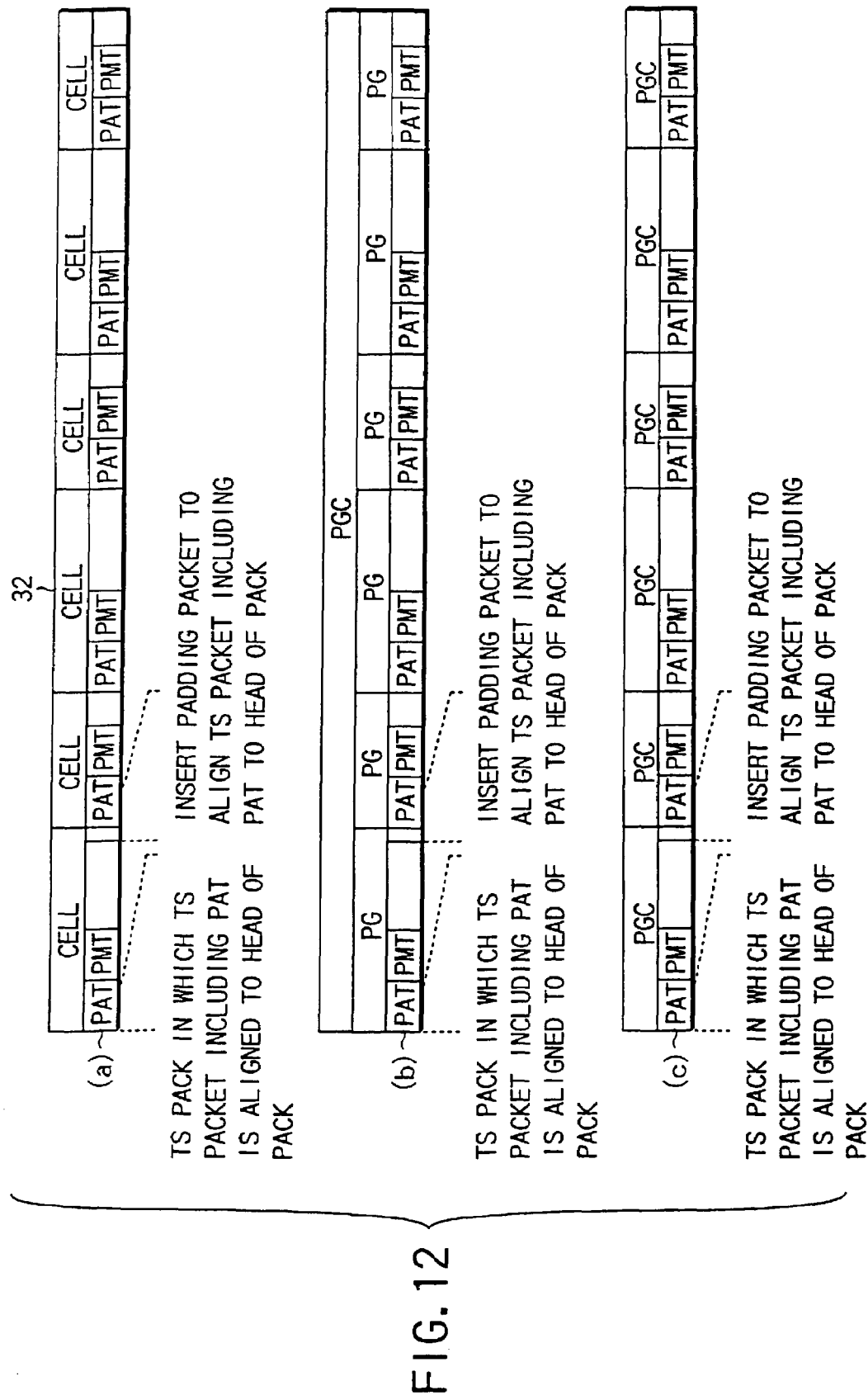
FIG. 12 illustrates explanatory views showing an example of the format structure of a cell or PGC shown in FIG. 6.

For this reason, as shown by (a) in FIGS. 12 and 13, a TS pack that includes a TS packet with SCD=0 at the head of the pack is adjusted to be located at the head of a cell. By aligning cells in this manner, editing in units of cells can be made, as shown by (b) in FIG. 13, and seamless playback between cells can be done even after editing, as shown by (c) in FIG. 13.

The fourth information is a method of presenting a cell or VOBU playback time, as shown in FIGS. 8 and 10, using PCR shown by (d) in FIG. 1.

Note that PCR indicates a transfer arrival reference time of a TS packet, and is not appended to all TS packets. But since a TS stream is data to be played back in real time, PCR is highly likely to indicate the same time as the playback time. However, since the playback time is contained in a payload, it cannot be used in a recording/playback DVD streamer unless the data is decrypted.

For this reason, the playback time is presented using PCR information and the STC in which that time data is set. In this manner, the playback time can be roughly represented. However, when PCR is not supported, the playback start time is set at STC=0, and counting is then started to use an STC value at a given timing as the playback time.

The fifth information is PAT and PMT packets shown by (b) in FIG. 11 and by (a) to (c) in FIG. 12, and these packets record the PIDs of data of a program which is to be played back. These packets are inserted at intervals of several 100 ms to several seconds; when a program is played back from a midway position, playback starts based on this data.

For this reason, these packets can be used to segment data, as shown by (b) in FIG. 11 and by (a) to (c) in FIG. 12.

Note that the PAT and PMT packets can be used in the following four segmentation methods in correspondence with the DVD video format.

First, as shown by (b) in FIG. 11, when the head of a VOBU (or SOBU) is aligned to that of a PAT packet, playback from a midway position in units of VOBUs (SOBUs) can be made. However, since video data after the PAT packet does not always start from an I-picture, a slight time lag is produced until an I-picture is found. For this reason, segmentation at the positions of I-pictures is preferable for VOBUs (SOBUs).

Second, as shown by (a) in FIG. 12, the head of a cell is aligned to that of a PAT packet to be used as the cell segmentation position. However, since PAT packets appear at intervals of several 100 ms to several seconds, cell segmentation positions are set every some PAT packets. However, in this method, since an edit point is not used as a reference point, if editing is done, continuity is disrupted, and seamless playback cannot be guaranteed. For this reason, cell segmentation based on SCD is preferable.

Third, as shown by (b) in FIG. 12, a program may be segmented using PAT packets. With this method, PG jump, PG skip, and the like can be implemented. However, since PAT packets appear at intervals of several 100 ms to several seconds, program segmentation positions are set every several ten to several hundred PAT packets.

Fourth, as shown by (c) in FIG. 12, a PGC may be segmented using PAT packets. With this method, PGC jump, PGC skip, and the like can be implemented. However, since PAT packets appear at intervals of several 100 ms to several seconds, program segmentation positions are set every several hundred to several thousand PAT packets.

The identification code of the STB indicates the type of digital broadcast that the STB connected can receive. With this code, the STB connected is checked upon playback, and the same STB used upon recording can be selected to play back data. Furthermore, this code can change operation that pertains to playback time presentation.

When the STB supports a command for outputting a playback time to a recorder, the playback time is periodically read from the STB and is presented. This value is most accurate as the playback time.

The system arrangement of a satellite broadcast compatible DVD recorder/player will be explained below with reference to FIG. 14.

Figure 14:
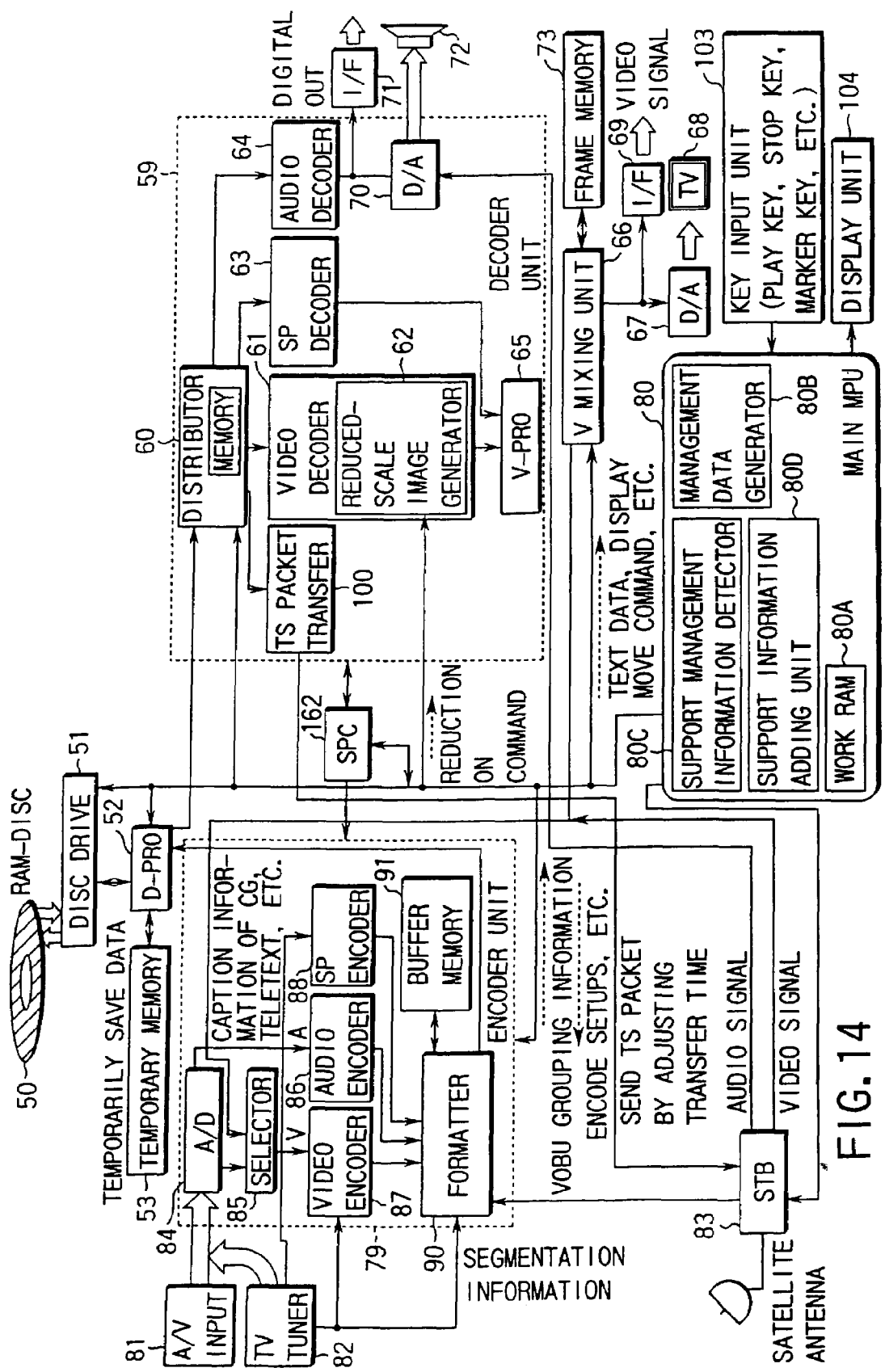
FIG. 14 is a block diagram showing the overall arrangement of a DVD recording/playback system according to an embodiment of the present invention.

Referring to FIG. 14, reference numeral 50 denotes a RAM disc, which is driven by disc drive 51 that exchanges data with data processor (D-PRO) 52. Temporary memory 53 for temporarily saving data is connected to data processor 52.

The recorder/player of FIG. 14 can record and playback an MPEG bitstream and/or a normal video signal. These bitstream and video signal may be recorded independently, or mixed with one another.

Decoder unit 59 in the system shown in FIG. 14 includes distributor 60 having a memory, which receives playback data transferred from data processor 52.

The playback data is demultiplexed by distributor 60 into video data, sub-picture data, and audio data (packet data). The video data is transferred to video decoder 61 having reduced-scale image (thumbnail picture) generator 62, and the sub-picture data and audio data are respectively transferred to sub-picture decoder 63 and audio decoder 64.

Digital video and sub-picture signals respectively decoded by video decoder 61 and sub-picture decoder 63 are synthesized by video processor (V-PRO) 65, and the synthesized signal is supplied to video mixing unit 66. Video mixing unit 66 is connected to frame memory 73 for temporarily storing a digital video signal in units of frames, and externally supplied text data or the like is mixed into a video frame. Then, the digital video signal is supplied to D/A converter 67, and a D/A-converted video signal is output to TV monitor 68. The digital video signal can be externally output via interface 69.

A digital audio signal from audio decoder 64 is supplied to D/A converter 70, and a D/A-converted audio signal is output to loudspeaker 72. The digital audio signal can also be externally output via interface 71.

Reduced-scale image (thumbnail picture) generator 62 of video decoder 61 generates a video signal of a reduced-scale image of transferred video data on the basis of a reduction ON command from main MPU 80, and supplies it to video processor 65 to display the reduced-scale image on TV monitor 68. Key input unit 103 having keys for instructing external commands such as playback (PLAY), stop (STP), a marker that appends a mark associated with a recording position, and the like, and display unit 104 are connected to main MPU 80.

Encoder unit 79 in the system shown in FIG. 14 can receive an AV input from external AV apparatus 81 or TV tuner 82, and can also receive digital broadcast data from STB 83. A satellite broadcast antenna for receiving digital broadcast data is connected to STB 83.

An AV signal from external AV apparatus 81 or TV tuner 82 is converted into a digital signal by A/D converter 84. In this case, a digital audio signal is supplied to audio encoder 86 and a digital video signal to video encoder 87 via selector 85, and these signals are MPEG-encoded.

When caption information such as character information or the like is output from TV tuner 82, it is supplied to sub-picture encoder 88 and is runlength-encoded.

Data encoded by encoders 86, 87, and 88 are supplied to formatter 90, to which buffer memory 91 is connected, are stored in video, audio, and sub-picture packets appended with packet headers by formatter 90, and these packets are converted into pack structures by appending pack headers.

These packs are grouped together in units of VOBUs (SOBUs), as shown by (d) in FIG. 2, and a number of VOBUs (SOBUs) are grouped into a cell. Then, a set of cells are grouped into video object VOB (SOB), and a video object set is formed as needed.

During the formatting process, formatter 90 generates management information with reference to segmentation information generated by TV tuner 82. For example, PGC information is generated with reference to segmentation information.

The generated management information and pack data are sent to data processor 52, which stores the generated management information in a management data table generated by and supplied from a management data generator 80B of main MPU 80. Then, the management and pack data are recorded on optical disc 50 via disc drive 51.

STB 83 directly supplies an MPEG2 transport stream corresponding to the selected program, i.e., title, to formatter 90. The stream is formatted, as shown in FIG. 1, and management information is generated. Data processor 52 stores the management data in a predetermined management data table, and the management data table and transport packets are similarly recorded on optical disc 50 via disc drive 51.

STB 83 incorporates a decoder, which decodes AV data in TS packets to convert it into audio and video signals. The audio and video signals are respectively supplied to loudspeaker 72 and TV monitor 68 via D/A converters 70 and 67.

TS packs 34 supplied to optical disc 50 are supplied to distributor 60 of decoder unit 59 via data processor 52 and disc drive 51. Distributor 60 detects with reference to the stream and substream IDs that packet data in these packs are TS packet data, and distributes those TS packets to TS packet transfer unit 100.

TS packet transfer unit 100 supplies TS packets 38 to STB 83 at predetermined transfer timings. Data in each TS packet is decoded by STB 83, and decoded audio and video signals are respectively supplied to loudspeaker 72 and TV monitor 68 via D/A converters 70 and 67.

In the aforementioned recording/playback operation, decoder unit 59 and encoder unit 79 execute data transfer and the like under the control of system time clocks 102.

The recording and playback processes will be explained below with reference to FIGS. 15 to 23.

Figure 15:
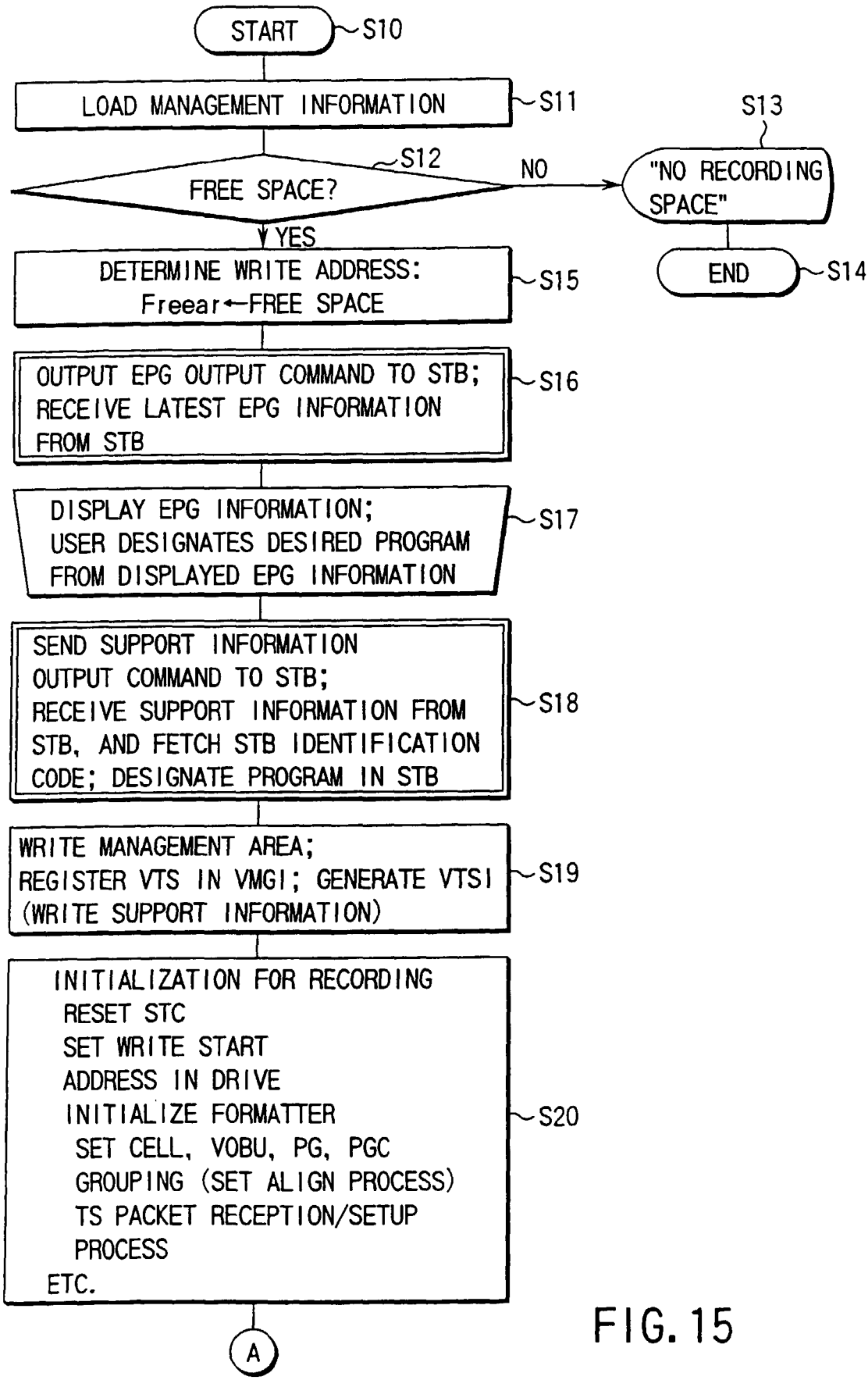
FIG. 15 is a flow chart for explaining a recording process in the format structure shown in FIG. 9.

A data process upon recording will be described first with reference to the flow charts shown in FIGS. 15, 16, and 17.

When main MPU 80 receives a recording command from key input unit 103 in step S10, the recording process starts.

Disc drive 51 loads management data from optical disc 50 in step S11, and it is checked in step S12 if a free space is available. If no free space is available, a message indicating no free space is displayed on display unit 103 in step S13, and the process ends in step S14.

On the other hand, if a free space is available, a write area is determined in an area corresponding to the free space, i.e., a write address is determined in step S15. In order to write recording data in the determined area, that address is written in the management area, and the write start address of video data is set in disc drive 51 to prepare for data recording. In step S16, a command for reading out EPG (electronic program guide) information from STB 83 is issued.

In response to a request from MPU 80, STB 82 prepares the latest EPG at that time. That is, STB 82 receives the latest EPG and saves it in a work memory. The EPG data which has been received or saved in the work memory in the STB 83 is sent back to MPU 80.

MPU 80 displays that EPG data in step S17 to make the user select a program to be recorded. After that, if the program to be recorded is determined, MPU 80 issues a command for outputting support information to STB 83, and receives support information from STB 83, as shown in step S18. At this time, MPU 80 also receives an STB identification code from STB 83 together with support information. The support information is detected by support management information detector 80C in MPU 80.

If no support information is available in STB 83, the presence/absence of support information is checked during information, and detected information is used instead. MPU 80 designates a target program to be recorded in STB 83, and make STB 83 start reception of the program.

MPU 80 issues an instruction for writing management information in the management area on optical disc 50 in step S19. That is, VTS is registered in VMGI to generate VTSI as a management data table for a video title set, and support information is written in VTSI. Or, STR_VMGI (FIG. 6) is prepared in step S19.

In DVD_RTR (a system for internally converting analog video data into MPEG data and recording the MPEG data in real time), the roles of VMGI and VTSI are integrated in RTR video manager information (RTR_VMGI). Hence, when a DVD_RTR recorder is used as a streamer, VMGI and VTSI (or STR_VMGI) may be read as RTR_VMGI as needed.

MPU 80 resets the time of STC 102 as an initialization process for recording in step S20. Note that STC 102 is a system timer, and recording and playback are executed with reference to the value generated by STC 102. Data of VMG and VTS files are written in a file system, and required information is written in VMGI and VTSI.

At this time, if support information has been detected, the detected support information is written. Furthermore, the respective units undergo recording setups. At this time, data segmentation is set in the formatter, as has been explained above with reference to FIGS. 11 to 13, and the formatter is set to receive TS packets.

Figure 16:
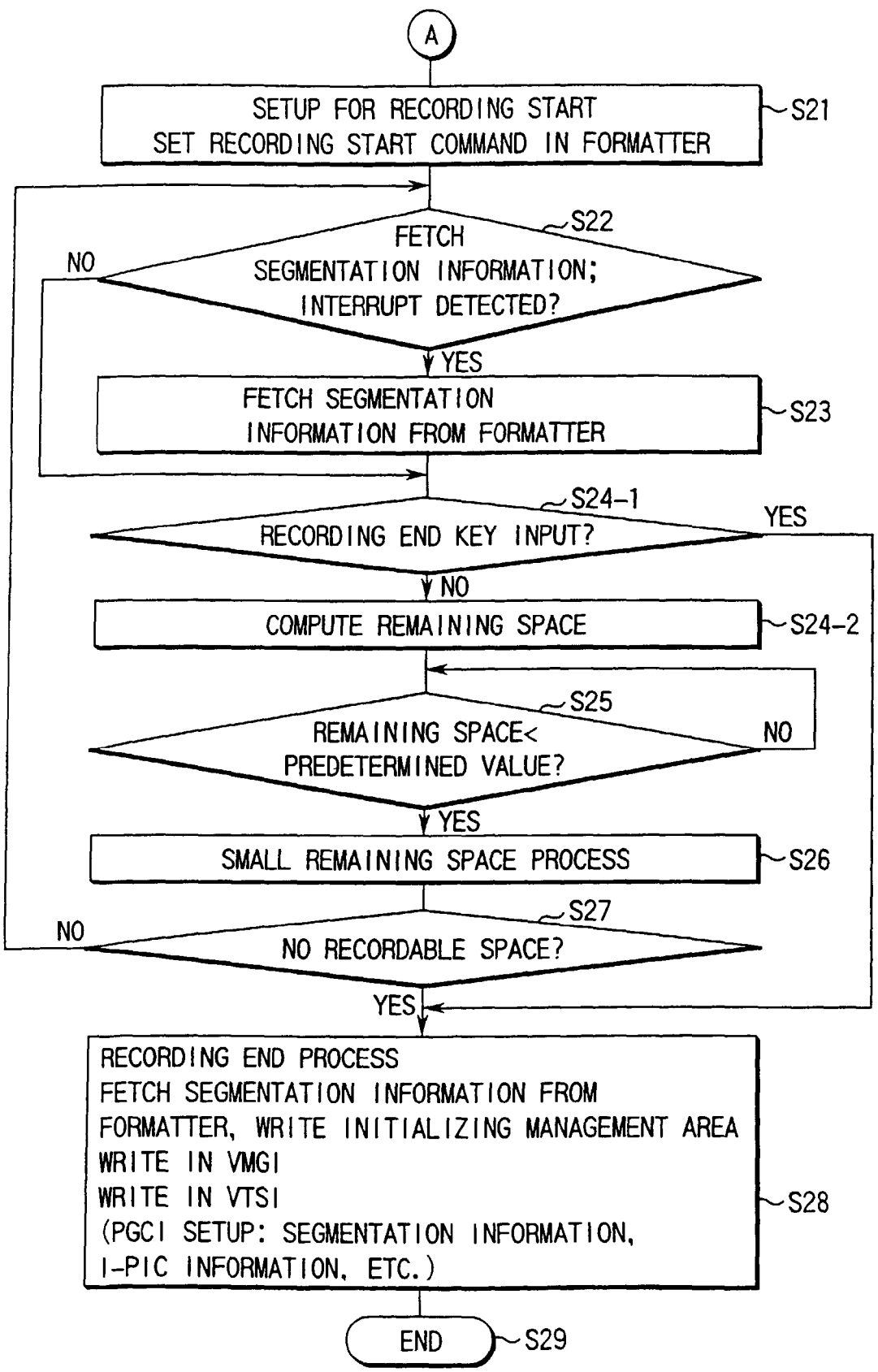
FIG. 16 is a flow chart for explaining a recording process in the format structure shown in FIG. 9.
Figure 17:
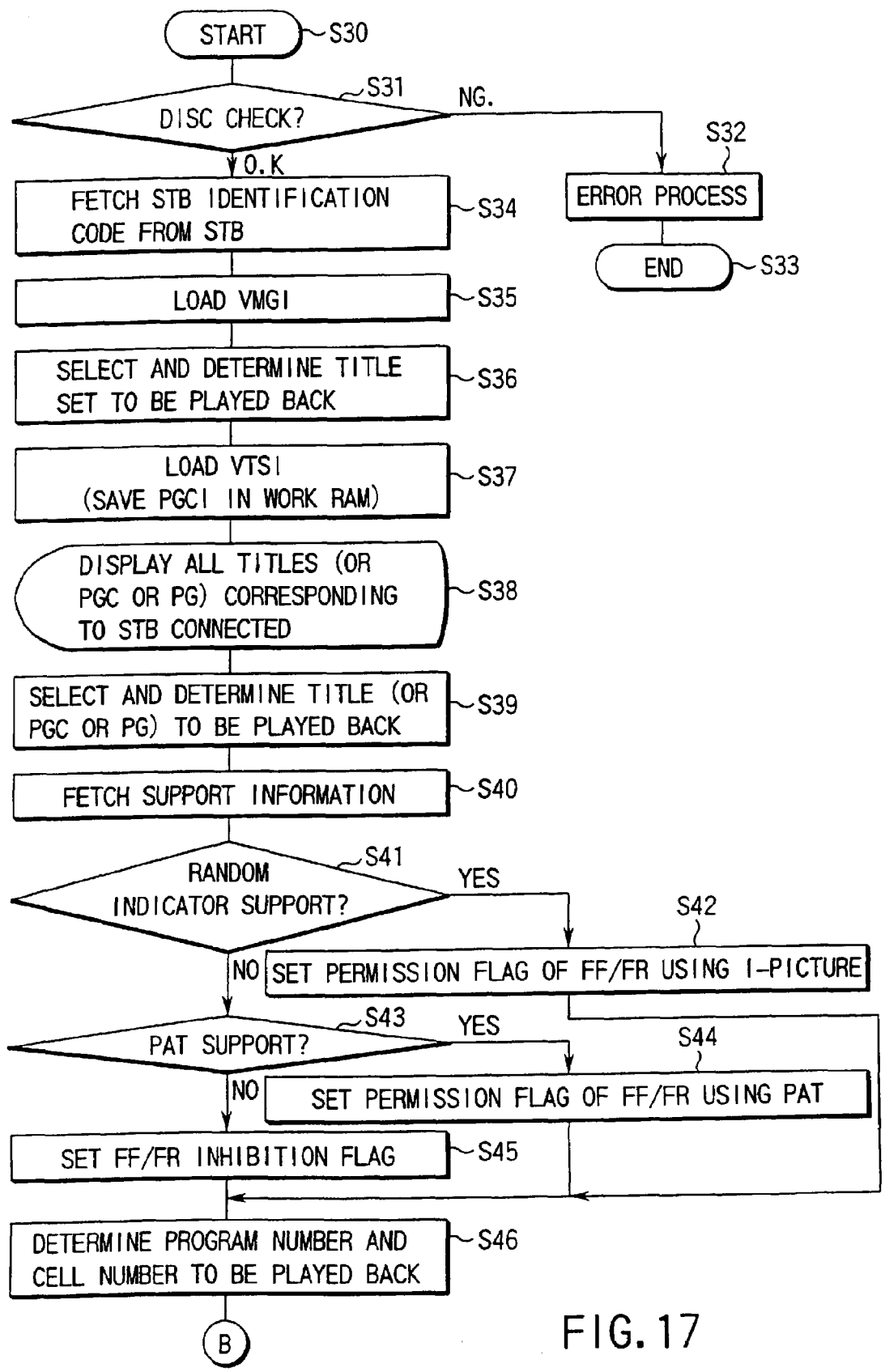
FIG. 17 is a flow chart for explaining a playback process in the format structure shown in FIG. 9.

Upon starting recording, the respective units undergo recording start setups in step S21 in FIG. 16. More specifically, a recording start command is supplied to formatter 90, which starts recording and formatting of recording data.

When recording has been started, MPU 80 checks in step S22 if an update input of segmentation information, i.e., data grouping information that has been explained with reference to FIGS. 11 to 13, is detected. If such input is detected, that segmentation information is saved in work RAM 80A of MPU 80 in step S23.

After the segmentation information is saved, or if segmentation information is not updated, it is checked in step S24-1 if a recording end key input is detected. If the recording end key input is detected, a recording end process is executed in step S28. If no recording end key input is detected, the size of the free area in optical disc 50 is checked in step S24-2 to compute the remaining space size.

It is checked in step S25 if the remaining space size has become equal to or smaller than a predetermined value. If the remaining space size is not equal to or smaller than the predetermined value, the flow repeats step S25 to periodically check the remaining space size. If the remaining space size has become equal to or smaller than the predetermined value, a process for a small remaining space size is done in step S26.

After that, it is checked in step S27 if no recordable space is available. If a sufficient recordable space is available, the flow returns to step S22 to repeat steps S22 to S26.

If no recordable space is available, a recording end process is done in step S28. In this recording end process, segmentation information for the remaining data is received from formatter 90, and is added to work RAM 80*a*. These data are recorded in management data (VMGI and VTSI; or RTR_VMGI; or STR_VMGI), and information for recorded data is recorded in the file system. After that, recording ends in step S29.

The flow of a video signal in the recording operation in the system shown in FIG. 14 will be described in detail below.

TS packets input from STB 83 are input to the formatter. The time elapsed from the transfer start timing is read from the STC value, and is saved in buffer RAM 91 as management information. This information is sent to MPU 80 together with segmentation information, and is recorded in management information. As segmentation information, VOBU (or SOBU) segmentation information, cell segmentation information, program segmentation information, and PGC segmentation information are generated, and are periodically sent to MPU 80.

Note that the VOBU (SOBU) segmentation information includes the VOBU (SOBU) start address, VOBU (SOBU) playback time, and I-picture start and end addresses. In the I-picture start address, the address of a pack that records a TS packet including an active random access indicator is set.

As for the I-picture end address, since a TS packet that stores video data immediately before a TS packet including an active unit start indicator after the random access indicator is active is an I-picture end packet, the address of a pack which records that TS packet is set in the I-picture end address.

As the VOBU (SOBU) playback time, the time required from the start to end of transfer of a VOBU (SOBU) is used instead.

Formatter 90 temporarily saves TS packet data in buffer memory 91. Then, the formatter packs the TS packet data input to obtain packed data, formats the packed data to obtain a pack sequence shown by (e) in FIG. 2, and inputs the pack sequence to D-PRO 52.

D-PRO 52 groups 16 packs together to obtain an ECC group, appends error correction data thereto, and sends the ECC group to disc drive 51. When disc drive 51 is not ready to record, D-PRO 52 transfers the ECC group to temporary memory 53 and waits until disc drive 51 is ready to record. When disc drive 51 is ready, D-PRO 52 starts recording. As temporary memory 53, a large-capacity memory is assumed since it must hold recording data for several min or more by high-speed access.

Note that a microcomputer can make read/write access to D-PRO 52 via a microcomputer bus to read/write the file management area or the like.

Upon completion of recording, an erasure inhibition flag (protect or archive flag) is cleared to permit erasure. That is, at the beginning of recording, erasure is allowed.

A data process upon playback will be explained below with reference to FIGS. 17 and 18.

Upon receiving a playback command, MPU 80 starts a playback process in step S30. Disc drive 51 searches disc 50 to check for any defects in step S31.

If any defects on disc 50 are found upon checking disc 50, an error process is executed in step S32, and playback comes to an end in step S33.

If no problem is found on disc 50, STB 83 connected is checked in step S34 to fetch its identification code. After that, disc drive 51 searches the management area on disc 50 to load its management information (VMGI or STRI including STR_VMGI) via D-PRO 52 in step S35, thus allowing the user to select a title set (one or more PGCs) to be played back.

When the user determines the title set (PGCs) to be played back and its address is determined in step S36, MPU 80 sends a read command of the determined address to disc drive 51. Hence, VTSI (or STR_VMGI) of the determined title set (PGCs) is loaded and PGCI (or play list search pointers) in the loaded VTSI (or STR_VMGI) is saved in work RAM 80A in step S37.

In step S38, all titles or PGCs (or programs (PGs)) corresponding to STB 83 connected in the selected title set are displayed. Based on this display, the user determines the title or PGC (or program) to be played back in step S39.

Subsequently, in step S40 support information in the management information shown in FIG. 7 or 9 is read out, and the individual units are set based on the support information. That is, it is checked in step S41 if the random-access indicator is supported. If the random access indicator is supported, a flag that permits FF and FR special playback modes based on I-picture is set in step S42.

If the random access indicator is not supported, it is checked in step S43 if PAT is supported. If PAT is supported, a flag that permits FF and FR special playback modes based on PAT is set in step S44. If PAT is not supported either, a flag that inhibits FF and FR special playback modes is set in step S45.

Upon completion of setups based on the support information, program and cell numbers from which playback starts are determined in step S46. MPU 80 sends a playback command of TS packets to STB 83 via an internal bus. MPU 80 also initially sets up distributor 60 to send TS packets to STB 83, and sets V mixing unit 66 to allow a display process of a video signal sent from STB 83 (step S47 in FIG. 18).

Disc drive 51 reads out sector data from disc 50 in accordance with a command sent from MPU 80, i.e., the determined program and cell numbers. D-PRO 52 corrects errors of readout data, and outputs corrected data to decoder unit 59 as pack data.

In decoder unit 59, distributor 60 determines based on the stream and substream IDs of the pack data that incoming data contains TS packets, and sends TS packets to TS packet transfer unit 100. The TS packets are then transferred to STB 83 (step S47).

STB 83 then decodes incoming TS packets. In case of normal broadcast reception, incoming data is directly written. But in case of data exchange via the internal bus, data transfer is done using REC and ACK signals as follows. That is, when a buffer consumed by STB 83 is empty, an REC signal is activated. When distributor 60 is ready to transfer data, an ACK signal is activated every time data is sent onto the bus. In this manner, data is transferred in response to a data transfer request from STB 83.

The sent TS packet data are played back by STB 83, and video data is converted into a TV signal via V mixing unit 66 and is displayed on TV monitor 68. Also, an audio signal is sent to D/A converter 70 to be converted into an analog audio signal, and the converted signal is played back from loudspeaker 72.

During playback, PCR data is periodically set in the STC, and the contents of the STC are displayed as a playback time. When STB 83 can transfer a playback time, playback time data is periodically transferred and displayed. If STB 83 can display a playback time based on PTS in video data, that playback time is displayed.

Figure 18:
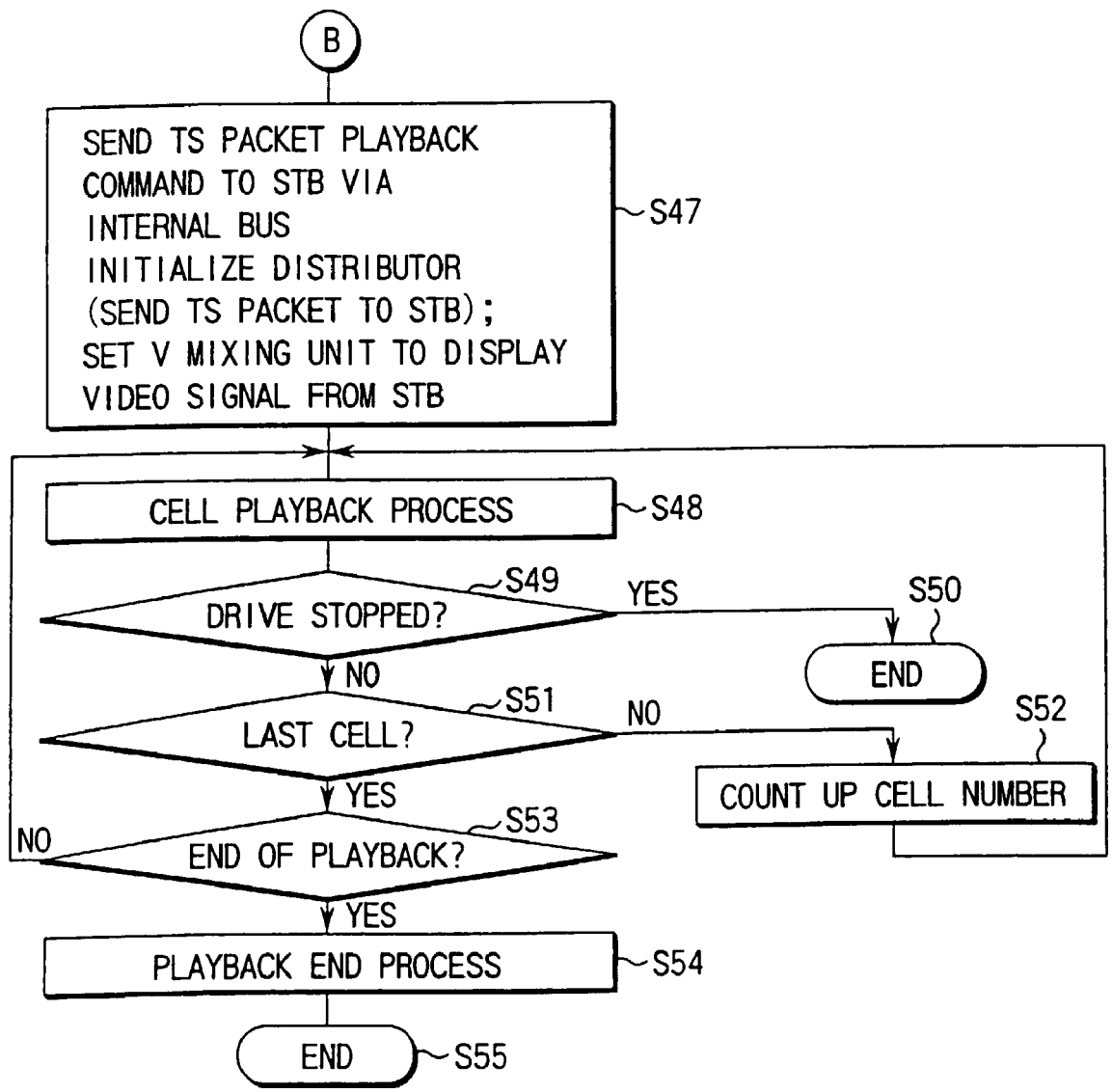
FIG. 18 is a flow chart for explaining a playback process in the format structure shown in FIG. 9.

The playback process is done in units of cells, as shown in step S48 in FIG. 18. MPU 80 always checks if disc drive 51 has stopped due to errors or the like after the cell playback process (step S49). If the drive has stopped, the playback operation comes to an end in step S50.

If disc drive 51 is in operation, it is always checked if the current cell is the last cell. If the current cell is not the last cell (step S51), the cell number is counted up in step S52, and the flow returns to the cell playback process in step S48.

If the last cell has been reached in step S51, it is checked in step S53 if playback is to end. If playback is not to end, the flow returns to step S48 to start playback of a cell of another program (or another play list) or PGC.

If the end of playback is determined in step S53, a playback end process is done in step S54, and the playback operation comes to an end in step S55.

The cell playback process shown in FIG. 18 will be explained in detail below with reference to FIG. 19.

Figure 19:
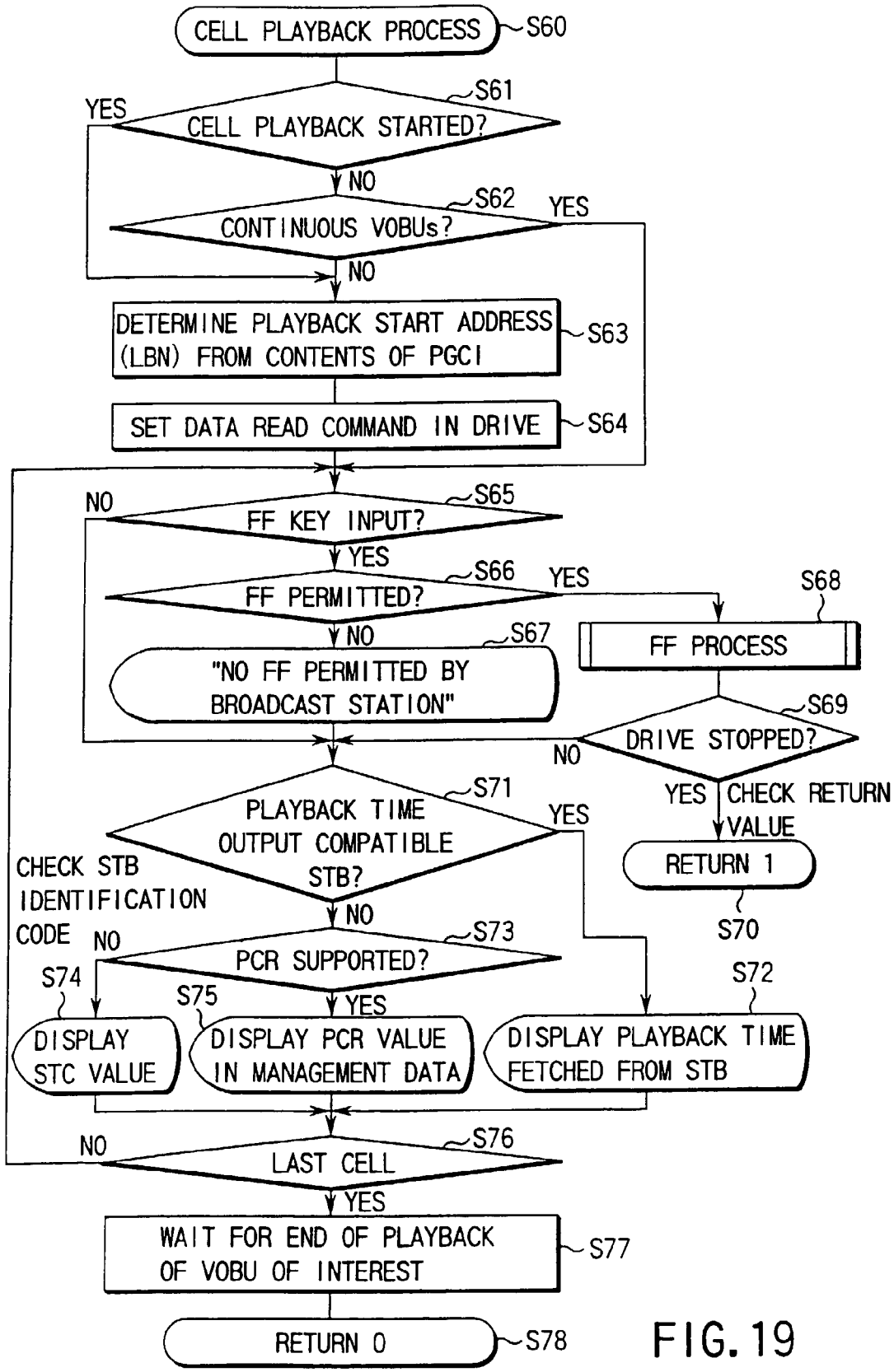
FIG. 19 is a flow chart for explaining an FF process in the format structure shown in FIG. 9.

Initially, when the cell playback process corresponding to step S48 in FIG. 18 starts in step S60 in FIG. 19, it is checked in step S61 if a cell playback process start request is detected. If no cell playback process request is detected, it is checked in step S62 whether VOBUs (or SOBUs) are continuous.

If VOBUs (SOBUs) are continuous, it is checked in step S65 if an FF key is input.

If VOBUs (SOBUs) are not continuous, a playback start address (logical block number LBN) is determined with reference to PGCI (or SOBI in FIG. 10) in step S63. In step S64, a data read command is sent to disc drive 51 using this address, and disc drive 51 starts a search.

After that, cell playback starts from the playback start address, and it is also checked in step S65 during playback if the FF playback key is input.

If it is determined in step S65 that the FF playback key is input, it is confirmed in step S66 if FF playback is permitted. If FF playback is not permitted, a message "no FF playback permitted by broadcast station" is displayed in step S67, and the flow advances to step S71. Note that FF operation is inhibited and the message "no FF playback permitted by broadcast station" is displayed when support information neither specifies I-picture nor supports PAT.

If FF playback is permitted, an FF process is executed in step S68. It is checked (step S69) if disc drive 51 has stopped due to errors or the like during the FF process, and if disc drive 51 has stopped, the FF process and playback process end in step S70.

If it is determined in step S65 that the FF playback key is not input, or if an FF non-permission message is displayed in step S67, or when drive 51 is not stopped in step S69, then it is checked in step S71 whether STB 83 is of a type that outputs a playback time.

If STB 83 outputs a playback time, the playback time output from STB 83 is displayed in step S72. If STB 83 does not output any playback time, it is confirmed with reference to support information in step S73 whether management data of an incoming TS packet includes PCR that describes time information.

If PCR is supported, the PCR value in management data of that TS packet is displayed in step S75, and the flow advances to step S76. If PCR is not supported, the measured by STC 102 is displayed (step S74), and the flow advances to step S76.

It is confirmed in step S76 if the current cell is the last cell. If the current cell is not the last cell, the flow returns to step S65 to execute steps S65 to S75 again.

On the other hand, if the current cell is the last cell, the control waits for the end of playback of VOBUs (or SOBUs) in that cell in step S77. Upon completion of VOBU (or SOBU) playback, the flow returns to the aforementioned step S54 of FIG. 18, as shown in step S78.

Special playback modes will be explained below with reference to FIGS. 20 to 23. In this example of special playback mode, FF playback will be explained. But the same applies to FR playback, and a detailed description thereof will be omitted.

Figure 20:
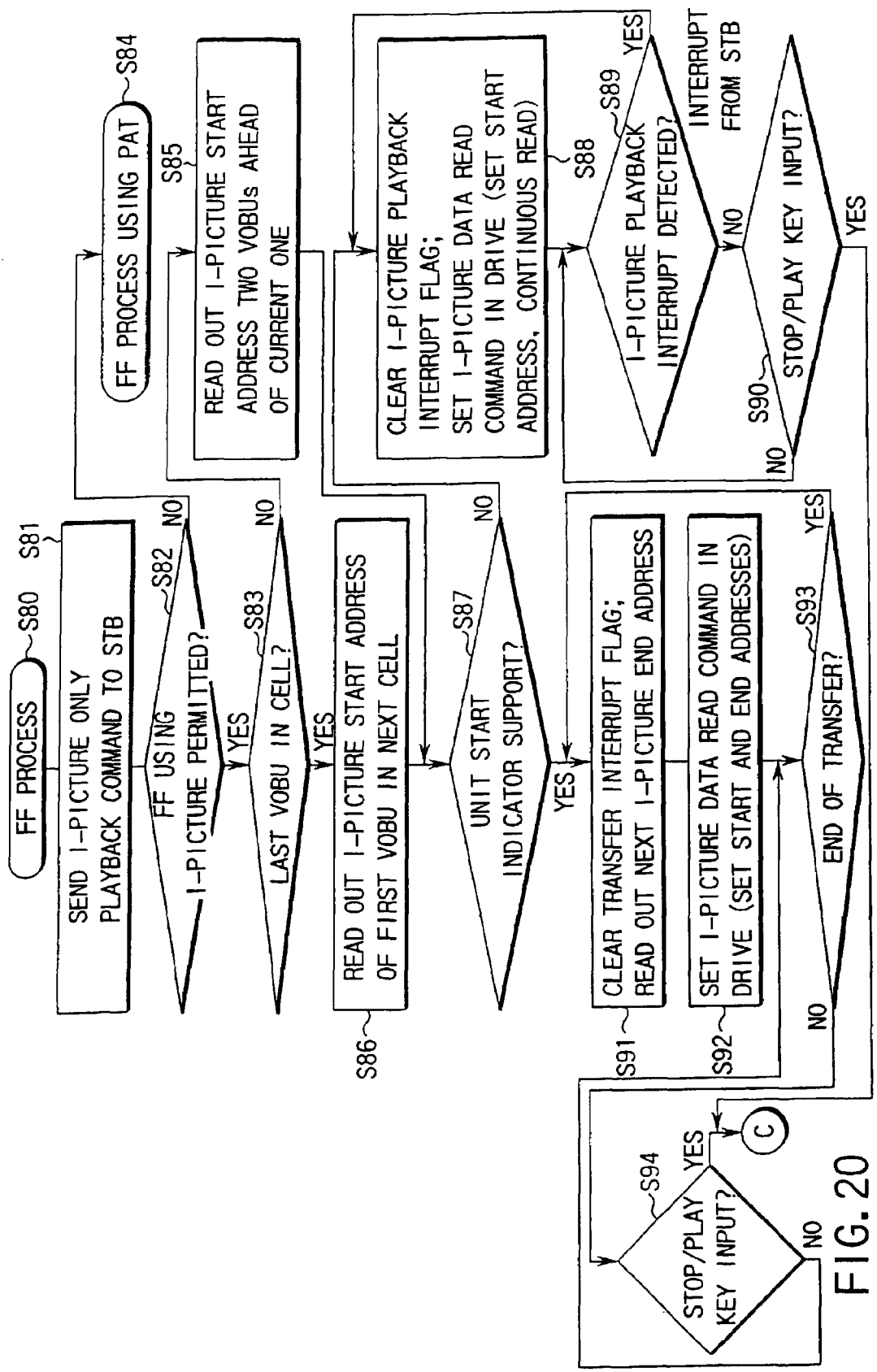
FIG. 20 is a flow chart for explaining an FF process in the format structure shown in FIG. 9.
Figure 21:
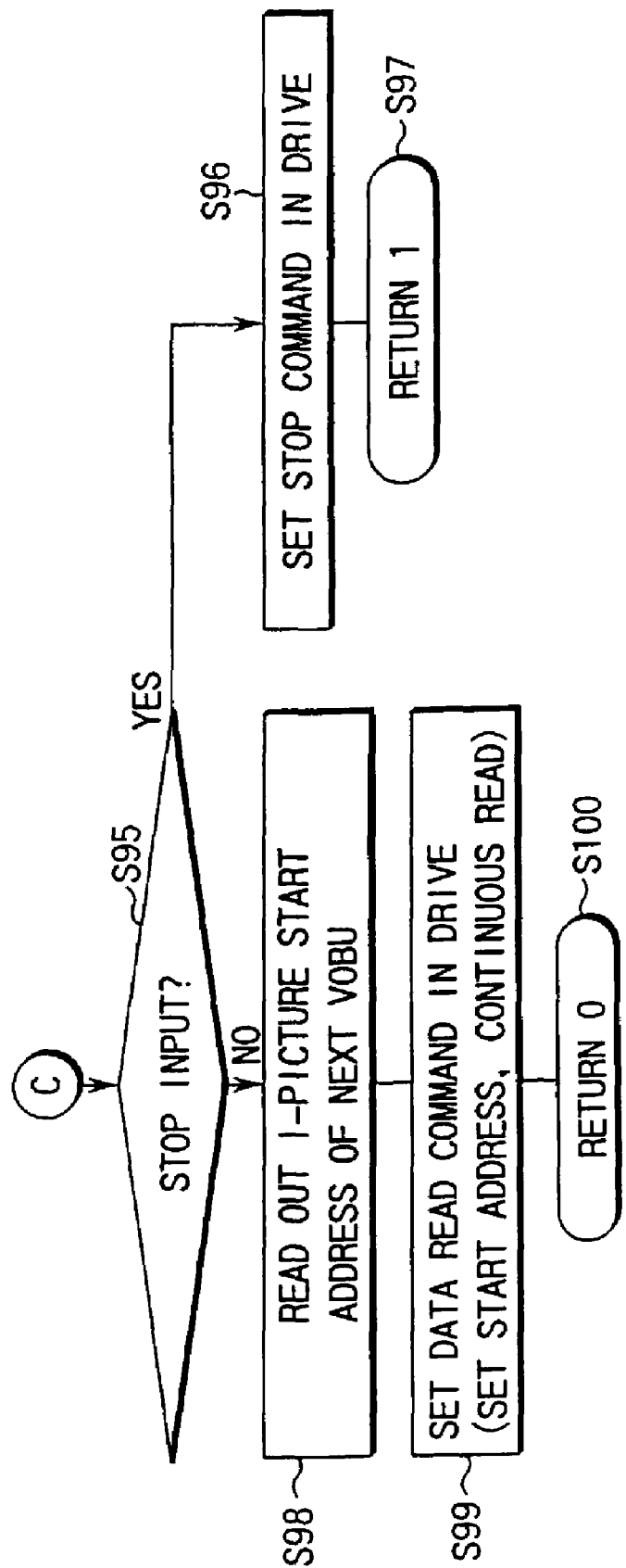
FIG. 21 is a flow chart for explaining an FF process in the format structure shown in FIG. 9.

In the FF playback process in step S68, the flows shown in FIGS. 20 and 21 are executed.

That is, when the FF process starts in step S80, an only I-picture playback command is sent to STB 83 (step S81). It is confirmed with reference to support information in step S82 if a TS packet supports the random access indicator. If the TS packet does not support the random access indicator, an FF process using PAT is started in step S84. The FF process using PAT will be explained later with reference to FIG. 23.

If the TS packet supports the random access indicator, it is confirmed in step S83 if a VOBU (SOBU) which is currently being transferred corresponds to the last VOBU (SOBU) in the cell. If the current VOBU (SOBU) is the last VOBU (SOBU), the I-picture start address in the next VOBU (SOBU) is read out in step S86, and the flow advances to step S87. On the other hand, if the current VOBU (SOBU) does not correspond to the last VOBU (SOBU), the I-picture start address, two VOBUs (SOBUs) ahead of the current VOBU (SOBU), is read out (step S85), and the flow advances to step S87.

It is checked in step S87 if the unit start indicator is supported.

If the unit start indicator is supported (YES in step S87), a transfer interrupt flag is cleared and the next I-picture end address is read out in step S91. Then, a read command designated with the start and end addresses of I-picture is sent to disc drive 51 in step S92, thus reading out I-picture data based on the I-picture start and I-picture end addresses.

In step S93, the control waits for a data transfer end interrupt, i.e., an interrupt from disc drive 51 to confirm if transfer of that I-picture data has ended.

If transfer has ended, the flow returns to step S91 to execute steps S91 and S92 again so as to playback the next I-picture. If transfer of the I-picture data has not ended, it is confirmed in step S94 if a STOP or PLAY key is pressed.

If neither of these keys are pressed, the flow returns to step S93 to wait for transfer of I-picture data. If either key is pressed, the flow advances to step S95 shown in FIG. 21.

If it is determined in step S87 that the unit start indicator is not supported (NO in step S87), an I-picture playback interrupt flag is cleared and a read command designated with the start address of I-picture and continuous read is issued to disc drive 51 in step S88.

After that, the control waits for an I-picture decode end interrupt, i.e., an interrupt from STB 83, and if an interrupt is detected, the flow returns to step S88 to execute steps S88 and S89 again.

If no interrupt is detected, it is confirmed in step S90 if a STOP or PLAY key has been pressed. If neither of these keys are pressed, the flow returns to step S89 to wait for an interrupt from STB 83. On the other hand, if it is determined in step S90 that either key is pressed, the flow advances to step S95 shown in FIG. 21.

Figure 22:
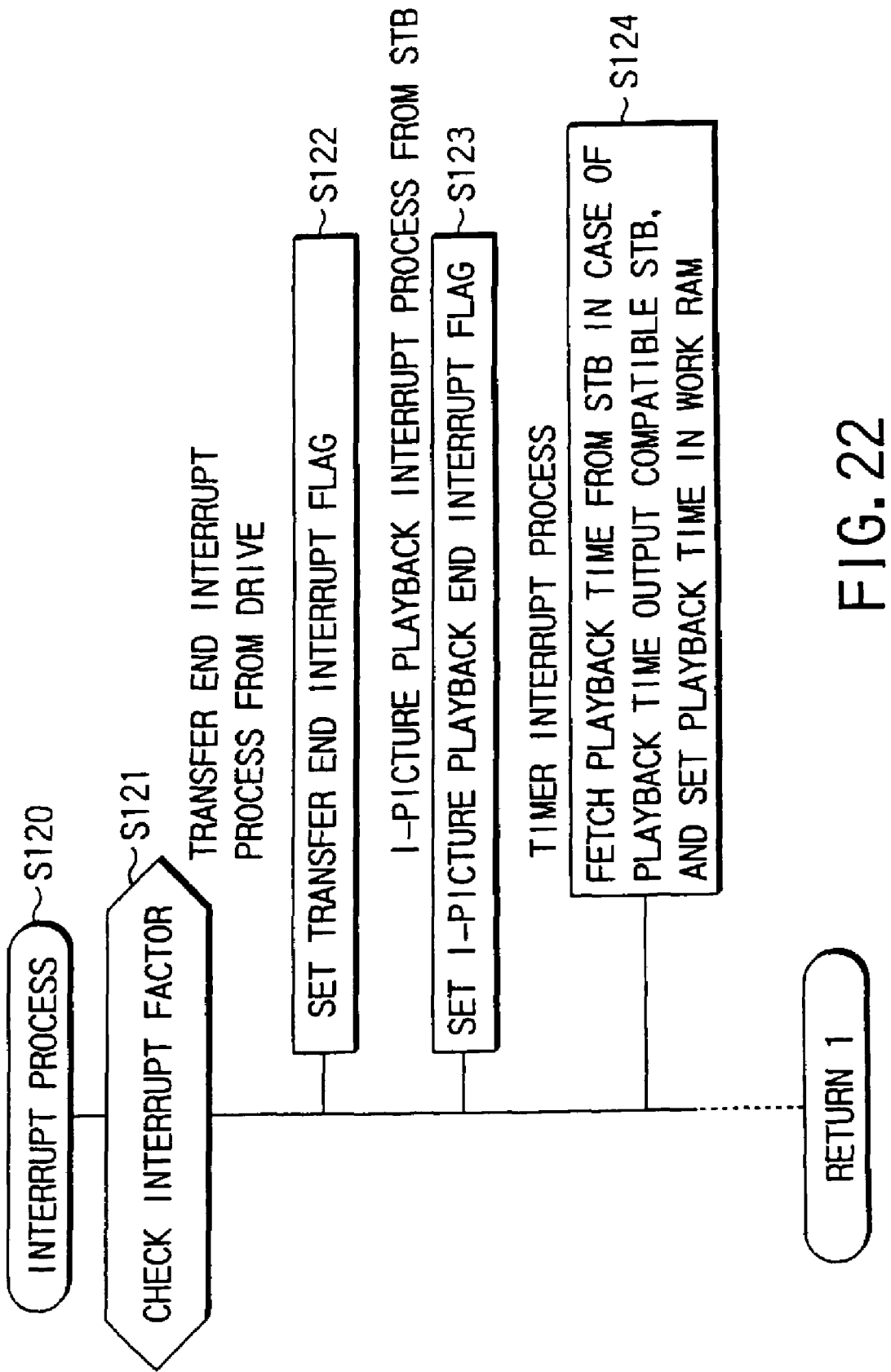
FIG. 22 is a flow chart for explaining an interrupt process in the flow charts shown in FIGS. 20 and 21.

The interrupt process (step S89 in FIG. 20) is executed, as shown in FIG. 22. That is, when the interrupt process is started in step S120, a factor of interruption is checked in step S121.

If this factor indicates a transfer end interrupt process from disc drive 51, a transfer end interrupt flag is set in step S122; if the factor indicates an I-picture playback interrupt process, an I-picture playback interrupt flag is set; or if the factor indicates a timer interrupt process, and if STB 83 can output a playback time, the playback time is received from STB 83 and is set in a work RAM. After such setups, the corresponding step is executed.

If it is determined in step S95 of FIG. 21 that the input key is the STOP key, a stop command is set in step S96, and the playback end process (step S54 in FIG. 18) is executed in step S97, thus ending playback.

On the other hand, if it is determined in step S95 that the PLAY key has been pressed, a read command provided at the I-picture start address of the next VOBU (SOBU) is sent to disc drive 51 in step S98, and a data read is started based on that address in step S99, thus reading out data in turn. After that, the flow of process returns to step S48 in FIG. 18, as shown in step S100, and the FF playback process ends.

As for FR playback, only the I-picture position to be read out is opposite to FF, and the flows shown in FIGS. 20 and 21 can be used. When the TS packet structure has a packet access pointer, the following process is done in the special playback mode.

When VOBUs (SOBUs) are grouped in units of I-pictures, since TS packets are aligned in units of VOBUs (SOBUs), no packet access pointer will be required. However, if VOBUs (SOBUs) are not grouped in units of I-pictures, a problem will be posed upon executing playback using the random access pointer.

More specifically, when a pack is to be read out based on the start address of I-picture, since I-picture is not always located at the head of a VOBU (SOBU), the start position of the data area of the pack is unlikely to match the segmentation (or split) start position of a TS packet. In such case, the packet access pointer (e.g., 0x2e as shown by (d) in FIG. 3) determines the segmentation (split) start position of the TS packet.

Figure 23:
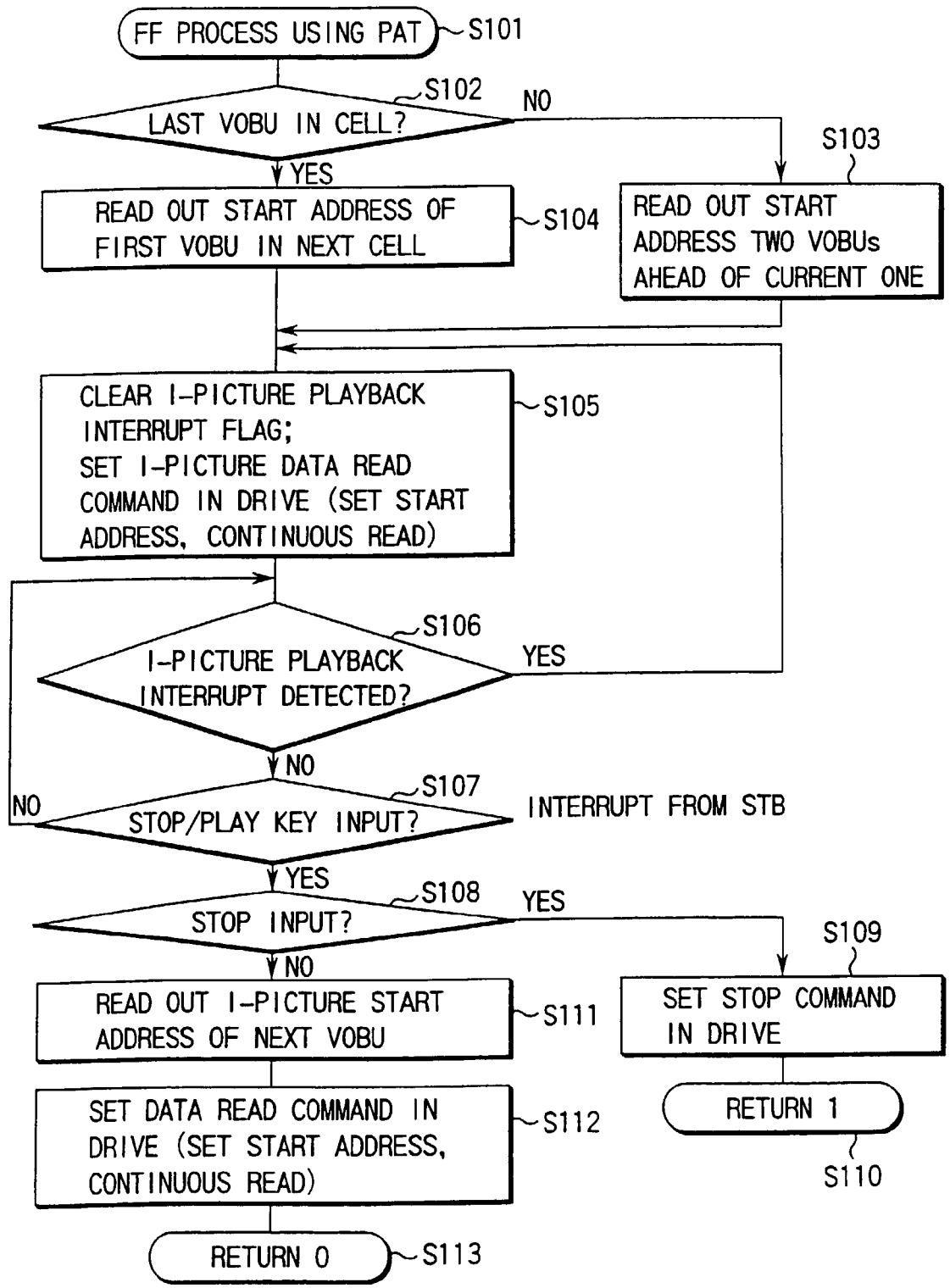
FIG. 23 is a flow chart for explaining a PAT process in the format structure shown in FIG. 20.

The FF process using PAT (program association table) in step S84 shown in FIG. 20 is done, as shown in FIG. 23.

When the FF process using PAT is started in step S101, it is checked in step S102 if the transferred VOBU (SOBU) is the last VOBU (SOBU) in a cell. If the transferred VOBU (SOBU) is the last VOBU (SOBU), the start address of a VOBU (SOBU) at the head of the next cell is read out in step S104. On the other hand, if the transferred VOBU (SOBU) is not the last VOBU (SOBU), the start address, two VOBUs (SOBUs) ahead of the current VOBU (SOBU), is read out in step S103.

In step S105, an I-picture playback interrupt flag is cleared, a read command with the start and end addresses of a VOBU (SOBU) is sent to disc drive 51, and the control waits for an I-picture decode end interrupt, i.e., an interrupt from the STB.

If an I-picture playback interrupt is detected in step S106, the flow returns to step S105. On the other hand, if no I-picture playback interrupt is detected, and transfer has ended, it is checked in step S107 whether the STOP or PLAY key has been operated. If no key input is detected, the flow returns to step S106.

It is confirmed in step S108 whether or not the input key is the STOP key. If the STOP key has been entered, a stop command is supplied to disc drive 51 in step S109, and a playback end process (step S54 in FIG. 18) is done in step S110.

On the other hand, if the input key is the PLAY key, a read command with the I-picture start address of the next VOBU (SOBU) is sent to disc drive 51 in step S111, and a data read is started based on that address in step S112, thus reading out data in turn. After that, the flow returns to step S48 in FIG. 18, as shown in step S113, thus ending the FF playback process.

In the following, stream data according to an embodiment of the present invention will be explained.

Figure 24:
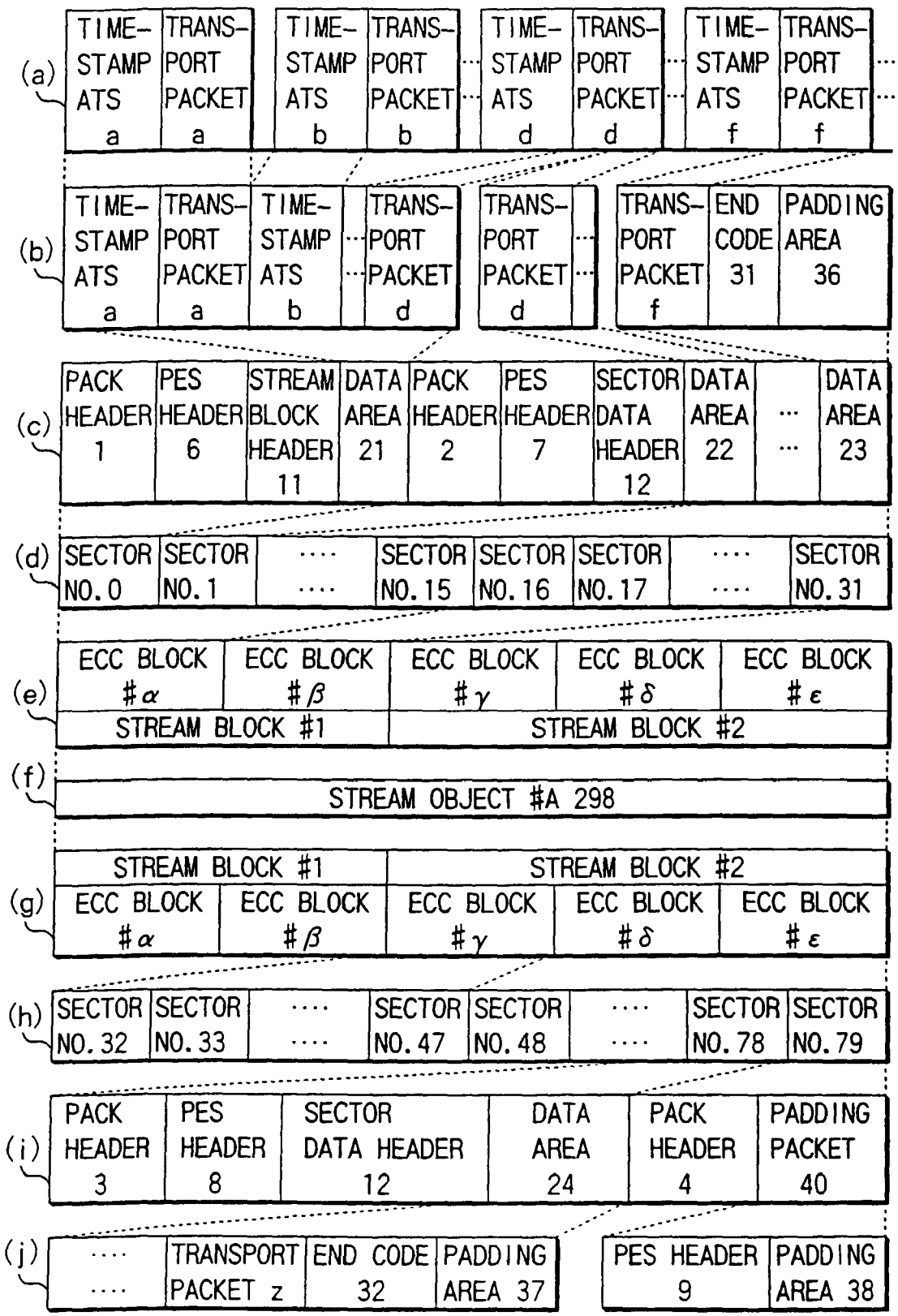
FIG. 24 shows a data structure of the stream data (corresponding to the MPEG2 transport stream of FIG. 1)

FIG. 24 shows a data structure of the stream data (corresponding to the MPEG2 transport stream of FIG. 1).

The stream data is recorded as a group of stream objects (SOB) for each content of video information in the stream data. One SOB of them is shown by (f) in FIG. 24, and is represented by SOB#A 298.

When such stream data is recorded on a DVD-RAM disc, the recording will be performed in minimum units of sectors each having 2048 bytes. A group of 16 sectors constitutes an ECC block in which performed are interleaving (re-ordering of arrangement of data pieces) and adding of error correction codes.

In the embodiment, a unit of one or more ECC blocks is used to constitute a stream block. Recording and/or partial erasing of stream information will be performed in unit of the stream block. In the embodiment, the number of ECC blocks constituting the stream block depends on a transport rate of the stream data to be transmitted.

In digital broadcasting, one transponder receives packets of a plurality of programs which are time-divided. For instance, when a second program is to be recorded on a information storage medium, STB unit 83 of FIG. 14 extracts the transport packets (TS packets in FIG. 3) of the second program only. At that time, in STB unit 83, the time information of reception of respective transport packets is added as a timestamp (ATS in FIG. 3).

Thereafter, when data is transmitted to formatter unit 90 of FIG. 14 according to IEEE1394, pairs of the timestamps (ATS) and the transport packets (TS packets) are finely segmented and the segmented ones are transmitted. In formatter unit 90, the stream data transmitted according to IEEE1394 is changed to the format as shown by (a) in FIG. 24, and recorded on information storage medium 50 of FIG. 14.

Figure 39:
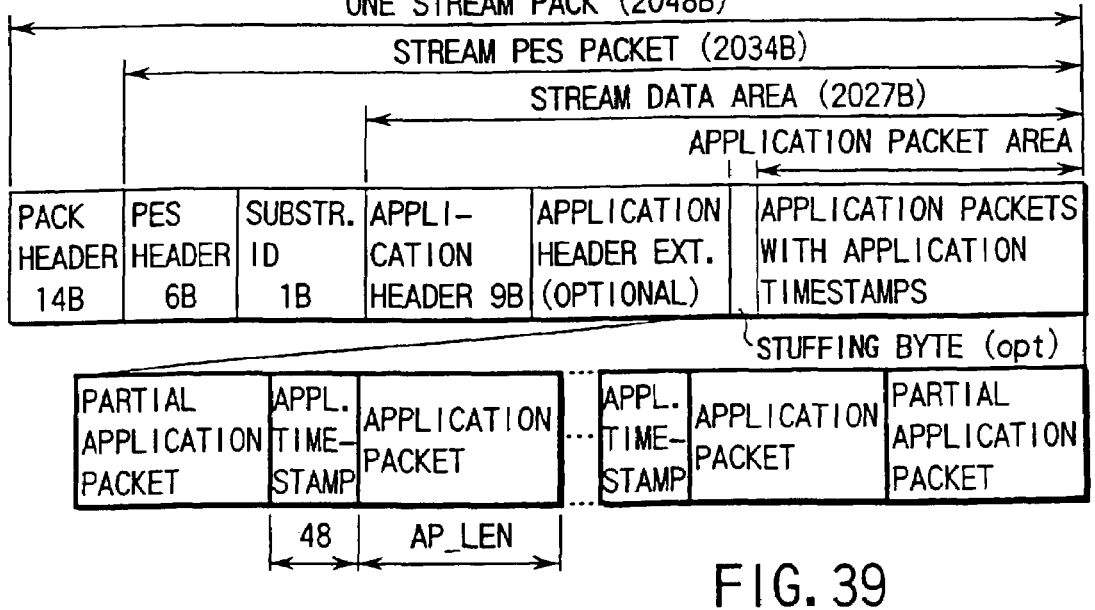
FIG. 39 shows the structure of stream data area in the stream PES packet shown in FIG. 38.

More specifically, a pack header and a PES header are arranged at the leading portion of each sector (cf. (c) in FIG. 24, FIG. 39), wherein the pack header includes information such as system clock information. In each of the stream blocks, and only for the leading one of the sectors therein, stream block header 11 is recorded immediately after the PES header. For other sectors following the leading sector, no stream block header is recorded, but sector headers 12, 13 are recorded immediately after the PES header.

The timestamps (ATS) and transport packets as shown by (a) in FIG. 24 are sequentially inserted in data areas 21-24 as shown by (c) and (i) in FIG. 24.

Note that in the example shown by (b) in FIG. 24, one transport packet d is recorded across two sectors (from No. 0 to No. 1).

When one transport packet is recorded across a plurality of sectors, it is possible to record a large packet having a size larger than the one sector size.

The digital broadcasting utilizes a multiply-segmented scheme applicable to multi-programs, or utilizes a transport stream, wherein the size of one transport packet is relatively small (188 bytes or 183 bytes).

Meanwhile, as in the example of data structure of FIG. 24, one sector has a 2048-byte size as mentioned earlier. Thus, even if the sizes of respective headers are subtracted from the 2048 bytes sector size, about ten transport packets can be recorded in one of data areas 21-24.

In contrast, in a digital communication network as ISDN, a long packet having 4094 bytes may be transmitted.

According to the present invention, one packet can be continuously recorded across a plurality of data areas. By so doing, it is possible to achieve not only recording of transport packets in one data area of digital broadcasting, but also recording of a large-size packet as the long packet of ISDN.

In other words, any type of packets, such as a transport packet of digital broadcasting or a long packet of digital communication, can be recorded in the stream block without fragments, independently of the packet size.

When a space remains in the stream block, padding data (that can be recognized as information of an unrecorded area) is recorded in the remaining space. More specifically, as shown by (b) in FIG. 24, end code 31 is placed after the last transport packet f in stream block #1, so that the remaining area is set as padding area 36.

FIG. 25 shows the internal structure of the stream block header as shown in FIG. 24.

In (d) of FIG. 24, a value larger than the size of data area 22 of sector No. 1 is set as the value of the first access point of sector No. 1. Then, it is indicated that the position of a timestamp exists in the subsequent sectors, wherein that timestamp corresponds to the subsequent packet next to the packet recorded in sector No. 1.

Information similar to said sector data header is also recorded in sector data header information 613 (FIG. 25) of stream block header 11.

Information pieces of stream block information 612 in which recorded is information relating to whole stream block are:
  record time 622 (date/time information of recording on the information storage medium);
  transport packet attribute 623 (attribute information relating the transport packet);
  stream block size 624 (data size of corresponding stream block (described by the number of ECC blocks));
  stream block time difference 625 (time range information in the corresponding stream block);

The above stream block time difference can be calculated as follows, when (b) in FIG. 24 is exemplified:

[stream block time difference]=[the value of first timestamp in stream block #2]−[the value of timestamp a]

Formatter unit 90 in FIG. 14 converts the stream data, which is input with the form of (a) in FIG. 24, into the form of (c) or (i) of FIG. 24, and the converted data is subsequently input to D-PRO unit 52.

In D-PRO unit 52, input data is grouped with 16 sectors to form an ECC block, and the ECC block is sent to disc drive unit 51.

Note that the sent ECC block data is sent to temporal storage unit 53 to temporarily store it, when disc drive unit 51 is not yet in a recordable condition, and the system waits for the preparation of recording. When disc drive unit 51 is in the recordable condition, the data stored in temporal storage unit 53 is read out to start the recording on the information storage medium.

The flow of signals in the stream data recording/reproducing apparatus according to an embodiment of the present invention will be as follows.

As mentioned, the structure of stream data to be recorded on information storage medium 50 is changed by formatter unit 90 to the data structure as shown by (c), (i) of FIG. 24.

In an embodiment of the present invention, assume that the same transport packet is prohibited from being recorded across different stream blocks. Under this assumption, when the timestamp and packet data both temporarily stored in a buffer memory are segmented for each stream block, it is necessary to completely include a pair of the timestamp and transport packet within one stream block.

On the other hand, according to an embodiment of the present invention, the same transport packet can be recorded across different sectors (e.g., No. 0 and No. 1 shown by (d) in FIG. 24). In this case, data segmentation for each sector will be mechanically performed based on a prescribed size assigned to each of data areas 21-24.

In digital broadcasting, video information is compressed according to MPEG2 specification, and the resultant I-, B-, and P-picture information is recorded in different transport packets. Then, these transport packets are transmitted.

The transport packet is constituted by a transport packet header and payload.

In the first one of transport packets wherein I-picture information is recorded, a flag of the random access indicator (corresponding to AUSM of (c) in FIG. 1) is set to "1". Meanwhile, in the other first one of transport packets wherein B- or P-picture information is recorded, another flag of the payload unit start indicator is set to "1".

Information of the random access indicator (AUSM) and information of the payload unit start indicator are used to prepare I-picture mapping table 641 (table of an access unit start map) and B, P-picture start position mapping table 642 (table of an access unit end map). These tables are shown by (e) in FIG. 25.

Each mapping table in transport packet mapping table 632 shown by (d) in FIG. 25 is configured to a bitmap format.

For instance, when "n" transport packets are recorded in one stream block, the value of number of transport packet 631 shown by (d) in FIG. 25 is set to "n".

In this case, each mapping table in (e) of FIG. 25 is formed of "n-bit" data, and bits of the "n-bit" data are respectively assigned to the transport packets in the stream block. These transport packets are sequentially arranged from the front of the stream block.

FIG. 26 shows an internal structure of the sector data header shown in FIG. 24.

Sector data headers 12 and 13 as shown by (c) and (i) in FIG. 24 represent information of data arrangements in data areas 21-24.

As shown in FIG. 26, each of these sector data headers is formed of first access point 651 and transport packet connection flag 652.

As shown by (b) in FIG. 24, transport packet d is recorded across two sectors. In this case, the last timestamp in these sectors is set to "1". When the recording of the transport packet is extended to the next sector, transport packet connection flag 652 is set to "1".

In the example shown by (b) in FIG. 24, the address in data area 22 at the leading position of timestamp is recorded (expressed by bit unit) in first access point 651 of (b) in FIG. 26. Here, the leading position of timestamp appears next to the latter sector of transport packet d which is recorded across former and latter sectors.

According to an embodiment of the present invention, a value larger than the size of data areas 21-24 can be used as the value of first access point 651. By so doing, it is possible to specify the leading position of timestamp of a large packet which has a size larger than the sector size.

For instance, in the data structure of (d) in FIG. 24, assume that one packet is recorded across sector No. 0 and sector No. 1, that the timestamp of this one packet is recorded at the first position in data area 21 of sector No. 0, and that the timestamp of the next packet is located at the T-th bit position in the data area of sector No. 2.

Under the above assumption, the value of the first access point for sector No. 0 is "0", the value of the first access point for sector No. 1 is "size of data area 22 of sector No. 1 plus T", and the value of the first access point for sector No. 2 is "T".

According to an embodiment of the present invention, reproduction or playback will be started basically from the start portion of the stream block. However, in a rare case, reproduction could be started from the leading portion of an ECC block which belongs to the second or subsequent one of ECC blocks in the stream block.

As in the case of FIG. 24, if the same transport packet d is recorded across two sectors (from sector No. 0 to sector No. 1), it is necessary to know where the next timestamp information is recorded when the reproduction is started from the leading portion of second or any subsequent ECC block.

For this, special header information (cf. the sector data header as shown by (a) in FIG. 26) is arranged at the leading portion of each sector. By recording the first access point 651 in the special header information, it is possible to easily start the reproduction from the leading portion of the second or any subsequent ECC block in the stream block.

SOB (stream object) is stream data which belongs to an original PGC (program chain). The data structure of SOB complies with Program Stream prescribed in "Information Technology-Generic coding of moving pictures and associated audio: Systems (ISO/IEC 13818-1)". A SOB is formed of only one type of data, that is stream data.

SOB data structure is defined as a sequence of Stream Packs, which have a fixed size of 2048 bytes. This is the same size as the Logical Block size of the DVD disc family, and every Stream Pack shall be recorded in a Logical Block.

FIG. 27 describes constraints on MPEG specifications for SOB.

More specifically, (1) a system header shall not be included in SOB; (2) a SCR (System Clock Reference) value in the first pack of SOB may have any value; (3) an MPEG_program_end_code shall not be included in SOB; and (4) a stream_id shall be equal to BFh (private_stream_2) in all PES packets.

Navigation data is provided to control the recording, playing back (or reproducing), and editing of any bitstreams. In DVD Stream Recording, navigation data is called "Streamer Information (STRI)".

Figure 28:
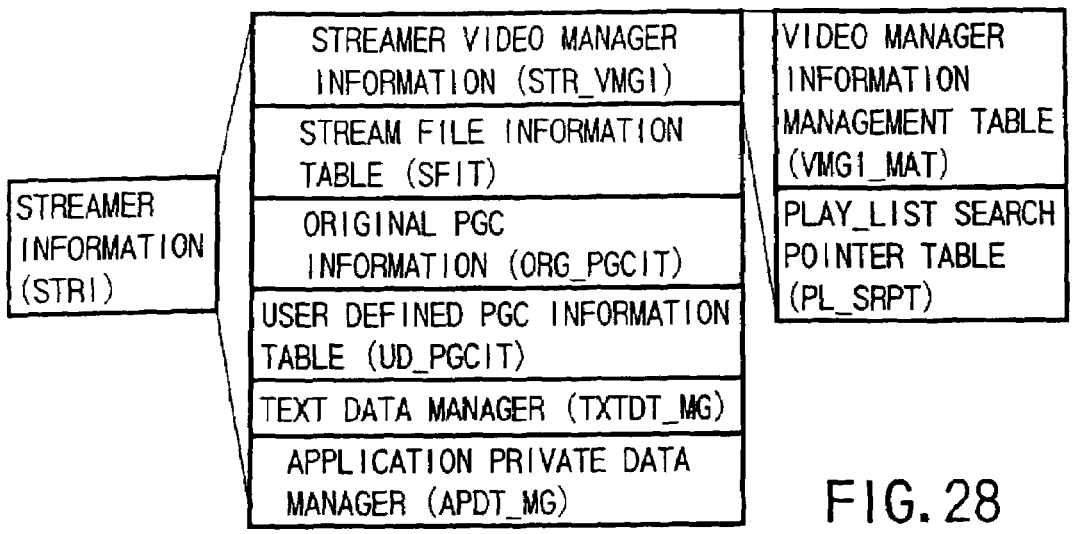
FIG. 28 shows the structure of navigation data (corresponding to control information 25 in FIG. 9) contained in DVD streamer information (STRI)

FIG. 28 shows the structure of navigation data (corresponding to control information 25 in FIG. 9) contained in DVD streamer information (STRI). As shown in FIG. 28, streamer information STRI is constituted by the following information.

That is, STRI is constituted by (1) Streamer Video Manager (STR_VMGI); (2) Stream File Information Table (SFIT); (3) Original PGC Information (ORG_PGCI); (4) User Defined PGC information Table (UD_PGCIT); (5) Text Data Manager (TXTDT_MG); and (6) Application Private Data Manager (APDT_MG).

STR_VMGI, SFIT, ORG_PGCI, UD_PGCIT, and TXT-DT_MG of FIG. 28 are recorded in a file named "SR_MAN-GR.IFO" in this order.

On the other hand, APDT_MG of FIG. 28 is recorded in another file named "SR_ADATA.DAT".

Stuffing coded as "00h" may or may not be inserted between tables of above (1)-(6) unless the size of STRI exceeds 512 kB, but no stuffing shall be inserted within a table of above (1)-(6)

Incidentally, most of information described in SR_MAN-GER.IFO is supposed to be kept in the system memory of streamer instruments (e.g., FIG. 14).

Streamer Video Manager Information STR_VMGI of FIG. 28 is formed of Video Manager Information Management Table (VMGI_MAT) and Play List Search Pointer Table (PL_SRPT).

Figure 29:
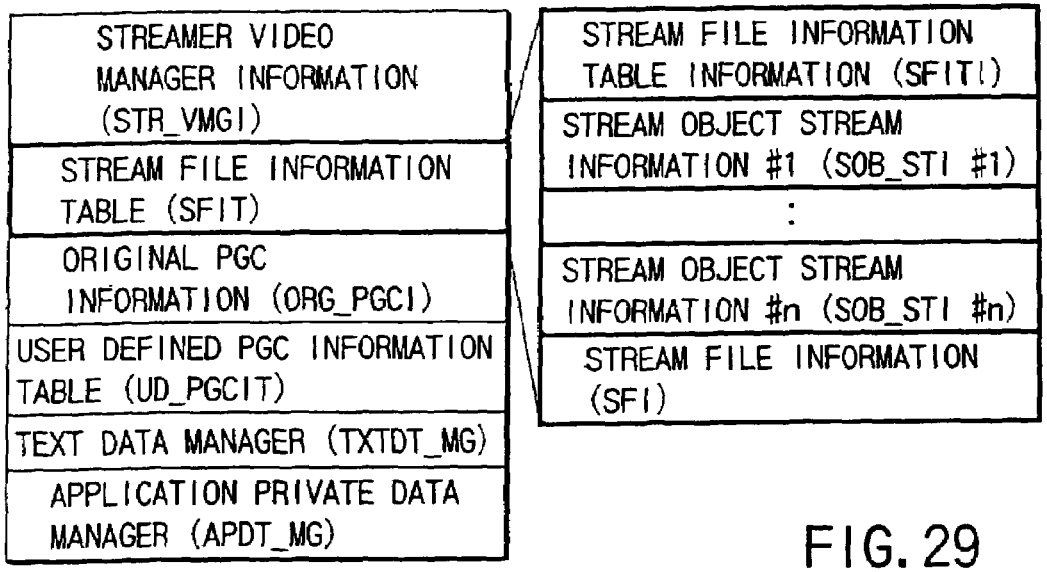
FIG. 29 shows the structure of Stream File Information SFIT shown in FIG. 28.

FIG. 29 shows the structure of Stream File Information SFIT shown in FIG. 28.

Stream File Information SFIT contains all navigation data which are directly relevant to the Streamer operation. As shown, SFIT is formed of one instance of Stream File Information Table Information (SFITI), zero or more instances of Stream Object Stream Information (SOB_STI), and zero or one instance of Stream File Information (SFI).

Stream File Information Table Information SFITI includes SFI_Ns indicating the number of stream files; SOB_STI_Ns indicating the number of SOB stream information items; SFIT_EA indicating the end address of SFIT; and SFI_SA indicating the start address of SFI.

Figure 30:
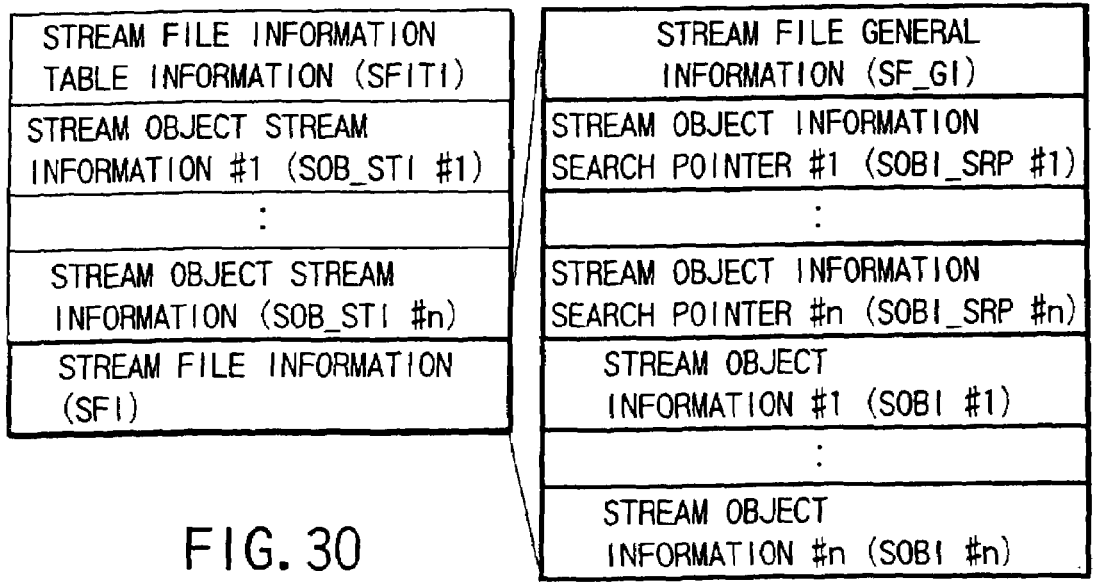
FIG. 30 shows the structure of Stream File Information SFI shown in FIG. 29.

FIG. 30 shows the structure of Stream File Information SFI shown in FIG. 29.

As shown, Stream File Information SFI is formed of (1) Stream File General Information (SF_GI); (2) one or more (n pieces) SOB Information Search Pointers (SOBI_SRP#n); and (3) one or more (n pieces) SOB Information (SOBI#n).

FIG. 31 shows the contents of Stream File General Information SF_GI shown in FIG. 30.

Stream File General Information SF_GI includes SOBI_Ns indicating the number of SOBIs; SOBU_SIZ indicating the size of SOBU by the number of sectors per SOBU; and MTU_SHFT indicating a mapping time unit shift.

SOBU_SIZ describes the size in sectors of the SOBU, and is defined as the fixed value 32. This means that in each mapping list the first entry relates to the application packets contained in the first 32 sectors of the SOB, the second entry relates to the application packets contained in the next 32 sectors, and so on.

The mapping time unit shift MTU_SHFT describes the weight of the LSB (least significant bit) of the mapping list entries, relative to the bits of the PAT describing format. This MTU_SHFT shall be described as 18.

FIG. 32 shows the structure of Stream Object Information (SOBI#) shown in FIG. 30.

As shown, each Stream Object Information SOBI is formed of (1) Stream Object Information General Information (SOBI_GI); (2) Mapping List (MAPL); and (3) (optional) Access Unit Data (AUD).

FIG. 33 shows the contents of Stream Object Information General Information SOBI_GI shown in FIG. 32.

As shown in FIG. 33, Stream Object Information General Information SOBI_GI includes (1) SOB_TY indicating the type of SOB; (2) SOB_REC_TM indicating the recording time of SOB; (3) SOB_STI_N indicating the stream information number of SOB; (4) AUD_FLAGS indicating the flags of Access Unit Data (AUD); (5) SOB_S_APAT indicating the start APAT (Application Packet Arrival Time) of SOB; (6) SOB_E_APAT indicating the end APAT of SOB; (7) SOB_S_SOBU indicating the first SOBU of the SOB; and (8) MAPL_ENT_Ns indicating the number of Mapping List entries.

SOB_TY describes the Stream Object Type, containing bits for Temporal Erase state and for Copy Generation Management System.

SOB_REC_TM describes the recording time of the associated Stream Object in DVD Stream Recording's Date and Time Describing Format.

SOB_STI_N describes the index of the SOB_STI which is valid for this SOB.

AUD_FLAGS describes whether and what kind of Access Unit Data (AUD) exists for this SOB. If AUD exists, then AUD_FLAGS also describes several properties of the AUD.

The AUD itself is constituted by some general information including the table AUSM and the optional tables AUEM and PTSL (Presentation Time Stamp List; cf. FIG. 34).

SOB_S_APAT describes the start Application Packet Arrival Time of the Stream Object, i.e., the packet arrival time of the first packet belonging to the SOB. SOB_S_APAT is described in DVD Stream Recording's PAT Describing Format.

PATs (Packet Arrival Times) are divided into two parts, namely a base part and an extension part. The base part holds the so-called 90 kHz unit value, and the extension part holds the less significant value measured in 27 MHz.

SOB_E_APAT describes the end Application Packet Arrival Time of the Stream Object, i.e., the packet arrival time of the last packet belonging to the SOB, in DVD Stream Recording's PAT Describing Format.

SOB_S_SOBU describes the number of the start Stream Object Unit, i.e., the Stream Object Unit containing the first Application Packet of the Stream object.

MAPL_ENT_Ns describes the number of Mapping List entries to follow after SOBI_GI.

FIG. 34 shows the structure of Access Unit Data AUD shown in FIG. 32.

Access Unit Data AUD (optional), if any, is formed of (1) Access Unit General Information (AU_GI); (2) Access Unit End Map (AUEM); and (3) Presentation Time Stamp List (PTSL). Which of these parts exist may be indicated by AUD_FLAGS of SOBI_GI.

AU_GI only exists, when AUD_FLAGS of SOBI_GI indicates that Access Unit Data exists.

FIG. 35 shows the contents of Access Unit General Information AU_GI shown in FIG. 34.

Access Unit General Information AU_GI includes AU_Ns indicating the number of Access Units, and AUSM indicating Access Unit Start Map (MAPL_ENT_Ns elements).

AU_Ns describes the number of Access Units for SOB. At the same time, AU_Ns describes the number of locations of Access Units, where AUSM indicates the existence of an Access Unit.

The Access Unit Start Map (AUSM) indicates which of SOBUs of the SOB contain Access Units. For each SOBU of the SOB, exactly one AUSM element exists. So, the AUSM is formed of MAPL_ENT_Ns elements.

Each AUSM element indicates an accessible Access Unit beginning somewhere within the corresponding SOBU, or within the subsequent SOBU. Exactly AU_Ns Access Units are indicated by the AUSM, equivalent to exactly AU_Ns bits of AUSM being equal to 1b (binary bit "1").

AUSM shall be byte aligned. If the concatenated AUSM elements are formed of a number of bits which is not an integer multiple of 8, then the remaining LSBs (least significant bits) of the last byte of the AUSM shall be padded with 0b (binary bit "0").

FIG. 36 illustrates an example of correspondence between Access Unit Start Map AUSM (cf. FIGS. 8 and 10) and stream object units SOBUs (cf. FIGS. 2, 4, and 11).

As will be seen from the illustration, each portion of bit "1" in AUSM indicates that the corresponding SOBU contains Access Unit (AU#).

Assume that AUSM_pos(i) is the bit position of the i-th set bit in AUSM ($i \leq i \leq AU\_Ns$). Under this assumption, the location of the AU can be defined as follows:

(1) If SOBU#i, indicated by AUSM_pos(i), contains more than one starting AU described by AU_START and AU_END marks (if any) inside the stream, then AUSM_pos(i) is assigned to the first AU starting in SOBU#i which is located inside the SOBUs described by AUSM_pos(i) and (if AUEM exists) AUEM_pos(i).

(2) An AU ends with the first occurring AU_END mark after the start of this AU, and an AU ends with the last SOBU indicated by the assigned AUEM element (if AUEM exists).

Note that with this kind of Access Unit Data, no more than one addressable Access Unit can be described per each SOBU of the SOB.

Figure 37:
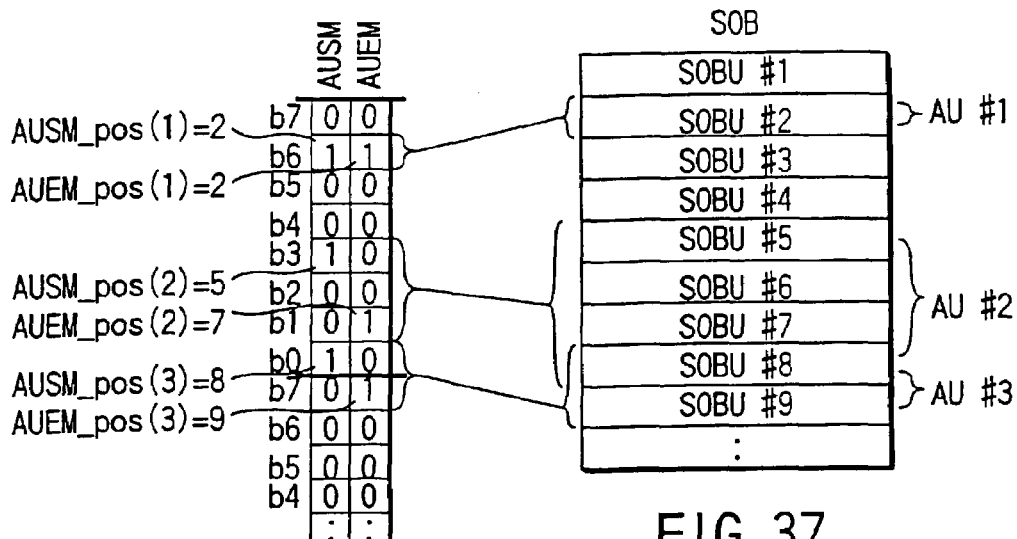
FIG. 37 illustrates an example of correspondence between Access Unit Start Map AUSM (cf.

FIG. 37 illustrates an example of correspondence between Access Unit Start Map AUSM (cf. FIGS. 8 and 10) with Access Unit End Map AUEM (cf. FIGS. 8 and 10) and stream object units SOBUs (cf. FIGS. 2, 4, and 11).

AUEM, if exists, is a bit array of the same length as AUSM. The bits in AUEM indicate which of the SOBUs contain the end of the bitstream segment associated with the Access Units of the SOB.

The number of bits set in AUEM shall be equal to the number of bits set in AUSM, i.e., each set bit in AUSM has its corresponding set bit in AUEM.

Assume that AUSM_pos(i) is the bit position of the i-th set bit in AUSM ($i \leq i \leq AU\_Ns$), and that AUEM_pos(i) is the bit position of the i-th set bit in AUEM ($i \leq i \leq AU\_Ns$). Under this assumption, the following conditions are obtained:

(1) $1 \leq AUSM\_pos(i) \leq AUEM\_pos(i) \leq MAPL\_ENT\_Ns$;

(2) AUSM_pos(i+1)>AUEM_pos(i);

(3) If i==AU_Ns, or if AUSM_pos(i+1)>1+AUEM_pos(i), then AU#i ends in SOBU#[AUEM_pos(i)], where $1 \leq i \leq AU\_Ns$;

(4) If AUSM_pos(i+1)==1+AUEM_pos(i), then the AU#i ends in SOBU#[AUEM_pos(i)], or ends in SOBU#[1+AUEM_pos(i)]==SOBU#[AUSM_pos(i+1)]. Thus, AU#i may end in the SOBU in which AU#i+1 starts ($1 \leq i \leq AU\_Ns$).

Figure 38:
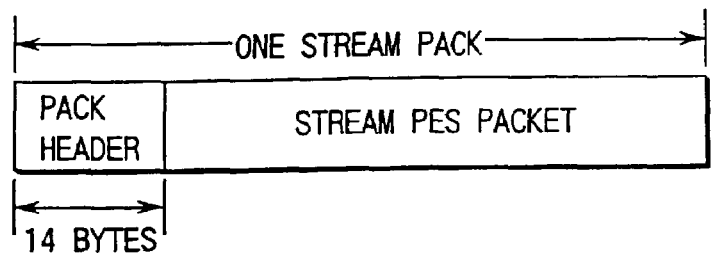
FIG. 38 shows the structure of one stream pack (corresponding to TS pack shown in FIGS. 2-4)

FIG. 38 shows the structure of one stream pack (corresponding to TS pack shown in FIGS. 2-4).

As shown, one stream pack (2048 bytes) is formed of a pack header (14 bytes) and a stream PES packet (2034 bytes).

The pack header of the stream pack has 14-byte size. The first 4 bytes (000001BAh) of the pack header record a pack start code. Next 6 bytes of the pack header are defined by a provider and they record the base of system clock reference (SCR_base; total 32 bits), marker bits, and the extension of system clock reference (SCR_extension; 9 bits). The subsequent 3 bytes (0189C3h) of the pack header record a program-multiplex rate (program_mux_rate; 22 bits) and marker bits. The last 1 byte (F8h) of the pack header records a pack stuffing length (pack_stuffing_length; 3 bits) and has reserved area (5 bits).

Note that the 32nd bit of the SCR_base[32] shall be set to zero and the "program_mux_rate" shall be set to 10.08 Mbps.

In stream recording, the application performs its own stuffing, so that the pack length adjustment methods of DVD-ROM Video or DVD-VR need not be used. In stream recording, it is safe to assume that the stream packets will always have the necessary length.

The stream PES packet of the stream pack has the following data structure.

FIG. 39 shows the structure of stream data area in the stream PES packet shown in FIG. 38.

As shown, one stream PES packet (2034 bytes) is formed of a PES header (6 bytes), a substream ID (1 byte), and a stream data area (2027 bytes).

The first 3 bytes (000001h) of the PES packet header of stream PES packet record a prefix of packet start code (packet_start_code_prefix; 24 bits). The next 1 byte records a stream ID (stream_id=10111111b; 8 bits). The subsequent 2 bytes (07ECh) record a length of PES packet (PES_packet_length). The last 1 byte records a substream ID (sub_stream_id=00000010b; 8 bits).

The stream data area (2027 bytes) inside a stream packet shown in FIG. 39 is formed of an application header (9 bytes), an optional application header extension, an optional stuffing byte, and an application packet area.

The application packet area of FIG. 39 is filled with a sequence of one or more application packets each prefixed by an application timestamp (corresponding to ATS in FIG. 3 or FIG. 24).

The application packet area may have a configuration similar to (b) in FIG. 3 (the "TS" packet of FIG. 3 is replaced with the application packet of FIG. 39). More specifically, a partial application packet may be recorded at the start of the application packet area. After the partial application packet, a plurality of pairs of application timestamps (ATSs) and application packets are sequentially recorded. At the end of the application packet area, a partial application packet may be recorded.

In other words, at the start of the application packet area, there may exist, in general case, a partial application packet. At the end of the application packet area, there may exist, in general case, another partial application packet or a stuffing area of "reserved" bytes.

The application timestamp (ATS) in front of each application packet has a 32-bit value. An ATS is divided into two parts, namely a base part and an extension part. The base part holds the so-called 90 kHz unit value, and the extension part holds the less significant value measured in 27 MHz.

In FIG. 39, the application header extension is used to store information that can differ from application packet to application packet. This kind of information may not be required for all kinds of applications.

Therefore, a data field in the application header is defined to describe the presence of the optional application header extension in the stream data area.

At stream recording, the first byte of the application timestamp ATS of the first application packet shall be aligned to the start of the application packet area in the first stream packet at the beginning of a stream object SOB.

Any following stream packets in a SOB may split (or divide) application packets across stream packet boundaries. The partial application packets shown in FIG. 39 are examples of the resultant split (or divided) application packets.

The byte offset of the first application timestamp that starts in a stream packet, as well as the number of application packets starting in the stream packet, shall be described in its application header (cf. FIG. 40).

This mechanism automatically allows for stuffing in front of the first application timestamp and after the last application packet in a stream packet.

The above automatic mechanism corresponds to "the application performs its own stuffing" described in the explanation of FIG. 38. By means of such automatic stuffing, the stream packet can always have a necessary length.

The optional application header extension is formed of a list of entries, where there is exactly one entry of 1 byte length for each application packet which starts in the stream packet. These bytes of the entries are used to store information that may differ from application packet to application packet.

In the optional application header extension (1 byte), AU_START (1 bit), AU_END (1 bit), and COPYRIGHT (2 bits) are described.

When AU_START is set to "1", this indicates that the associated application packet contains a random access entry point (start of a random access unit) in the stream.

When AU_END is set to "1", this indicates that the associated application packet is the last packet of a random access unit.

COPYRIGHT describes the copyright status of the associated application packet.

FIG. 40 shows the contents of the application header at the start of the stream data area shown in FIG. 39.

The application header contains 1-byte VERSION (01h); 1-byte AP_Ns; 2-byte FIRST_AP_OFFSET; 2-bit EXTENSION_HEADER_INFO (00b, 10b, or 11b); 1-bit reserved for CCI_ESC; 5-bit reserved area; 2-byte SERVICE_ID; 1-byte MAX_BR_LOG2; and 1-byte SMO_BS_LOG2.

The VERSION describes the version number of the application header format.

The AP_Ns describes the number of application packets which are starting in the stream packet. An application packet is considered to be starting in a stream packet, if the first byte of its application timestamp is stored in that stream packet.

The FIRST_AP_OFFSET describes the position of the timestamp of the first application packet, which starts in the stream packet, relative to the first byte of the stream pack, in bytes. If no application packet starts in the stream packet, FIRST_AP_OFFSET shall be set to "0".

The EXTENSION_HEADER_INFO describes whether an application header extension and/or a stuffing byte exist in the stream pack.

When EXTENSION_HEADER_INFO=00b, no application header extension follows this application header and no stuffing byte exists.

When EXTENSION_HEADER_INFO=10b, an application header extension follows this application header but no stuffing byte exists.

When EXTENSION_HEADER_INFO=11b, an application header extension follows this application header and a stuffing byte exists after the application header extension as well.

Here, EXTENSION_HEADER_INFO=01b is prohibited.

The optional stuffing byte in front of the application packet area can be activated (EXTENSION_HEADER_INFO=11b) to avoid a "packing paradox", where a contradiction exists between the number of bytes in the application header extension and the number of application packets which can be stored in the application packet area.

The SERVICE_ID describes an ID for the service that generated the stream. If the service is unknown, 0x0000 shall be described.

The MAX_BR_LOG2 describes the binary logarithm of the output bitrate parameter of the leaky bucket flow control model.

The SMO_BS_LOG2 describes the binary logarithm of the buffer size parameter of the leaky bucket flow control model.

To restate, according to the present invention, AUSM, AUEM and/or support information can be recorded and, hence, user friendly data management can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for recording bitstream data on an information medium, which comprises
   a data structure stored in said information medium including,
   a stream pack including an application header and application packets configured to contain the bitstream data of MPEG-TS, wherein,
   the stream pack is contained in a data unit and the data unit is contained in a data object corresponding to the bitstream data,
   said information medium is an information medium having a data area configured to store the bitstream data using at least one said stream pack, and a management area configured to store management information that pertains to the bitstream data, said management information being configured to control reproduction of the bitstream data,
   the management information includes information for managing a cell which represents a portion of a program corresponding to recorded contents of the data object, positional information of management data for managing the data object, start and end information of the cell relating to an arrival time of the application packets, number information by which the cell is related to the data object, and size information of the data unit including the application packets, and
   the recording location of said management information being different from that of said data area for storing the bitstream data using the stream pack,
   said method comprising:
   forming the bitstream data according to said data structure and recording this bitstream data on the data area; and
   generating the management information according to said data structure and recording this management information on the management area.

2. A method for reproducing bitstream data from an information medium which comprises
   a data structure stored in said information medium including,
   a stream pack including an application header and application packets configured to contain bitstream data of MPEG-TS, wherein,
   the stream pack is contained in a data unit and the data unit is contained in a data object corresponding to the bitstream data,
   said information medium is an information medium having a data area configured to store the bitstream data using at least one said stream pack, and a management area configured to store management information that pertains to the bitstream data, said management information being configured to control reproduction of the bitstream data,
   the management information includes information for managing a cell which represents a portion of a program corresponding to recorded contents of the data object, positional information of management data for managing the data object, start and end information of the cell relating to an arrival time of the application packets, number information by which the cell is related to the data object, and size information of the data unit including the application packets, and
   the recording location of said management information being different from that of said data area for storing the bitstream data using the stream pack,
   said method comprising:
   reproducing the management information from the management area; and
   reproducing the bitstream data from the data area based on the reproduced management information.

* * * * *